United States Patent
Odani et al.

[11] Patent Number: 5,850,552
[45] Date of Patent: Dec. 15, 1998

[54] OPTIMIZATION APPARATUS FOR REMOVING HAZARDS BY ARRANGING INSTRUCTION ORDER

[75] Inventors: Kensuke Odani, Kyoto; Junko Sayama, Settsu; Akira Tanaka, Kyoto, all of Japan

[73] Assignee: Matsushita Electric Industrial Co., Ltd., Kadoma, Japan

[21] Appl. No.: 628,904

[22] Filed: Apr. 8, 1996

[30]  Foreign Application Priority Data

Apr. 27, 1995  [JP]  Japan .................................. 4-104300

[51] Int. Cl.⁶ ................................ G06F 9/45; G06F 9/44; G06F 9/38
[52] U.S. Cl. .......................... 395/709; 395/392; 395/395
[58] Field of Search .................................... 395/705, 709, 395/392, 395, 707

[56]  References Cited
U.S. PATENT DOCUMENTS 5,107,418  4/1992  Cramer et al. ........................... 395/700
5,119,495  6/1992  King ........................................ 395/700
5,161,216  11/1992  Reps et al. ............................... 395/375
5,448,737  9/1995  Burke et al. ............................. 395/700

FOREIGN PATENT DOCUMENTS 3135630  6/1991  Japan .

Primary Examiner—Emanuel Todd Voeltz
Assistant Examiner—Kakali Chaki
Attorney, Agent, or Firm—Price, Gess & Ubell

[57]  ABSTRACT

An optimization apparatus is provided for removing hazards from a program by rearranging instructions for each program segment. The apparatus comprises: a Directed Acyclic Graph (DAG) generating means for generating DAGs for each program segment; a hazard marking means for marking hazard-including combinations of a parent instruction and a child instruction in the DAGs for hazard; and a rearranging means for rearranging the instructions for each program segment so that instructions are inserted between the instructions of each marked combination, wherein the inserted instructions do not destroy values stored in resources used by the instructions of the marked combination.

32 Claims, 17 Drawing Sheets instruction sequence without hazard

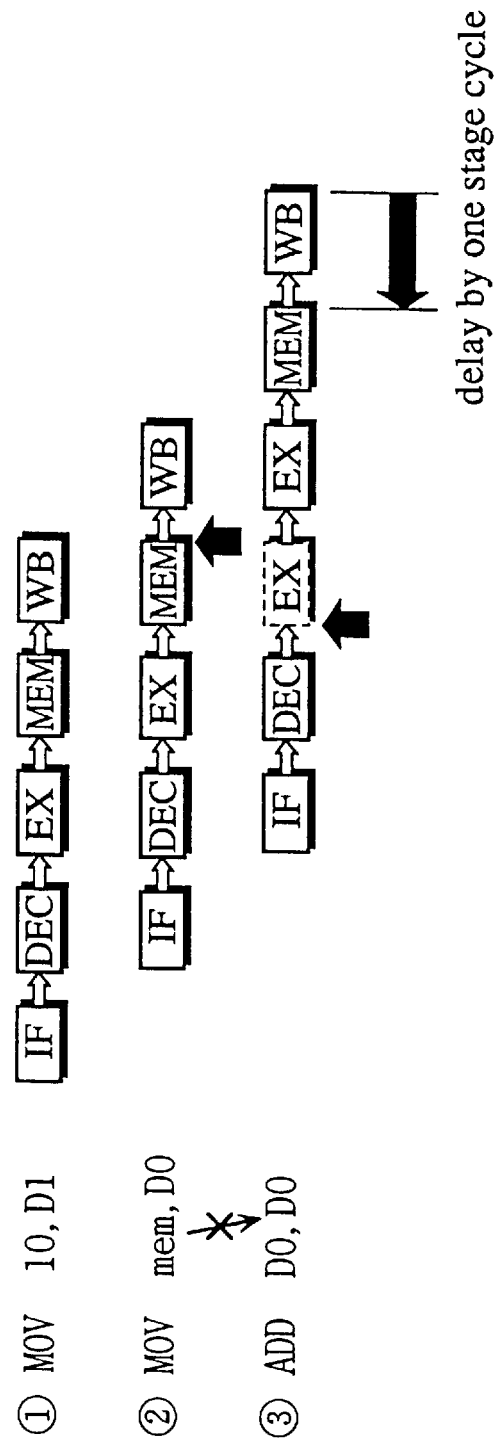

DAG data structure initial state of basic block

Fig. 8A
| register D0 | register D1 | register D2 | address register A0 | carry flag |
|---|---|---|---|---|
| S | 4 | not used | not used | not used |
Fig. 8B
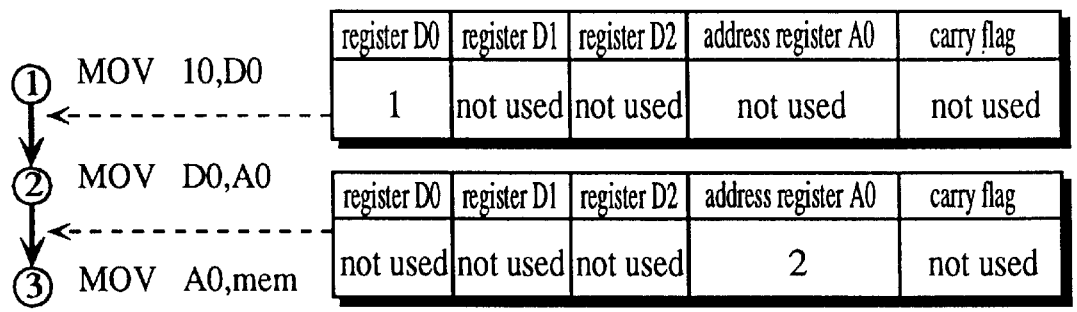
Fig. 8C
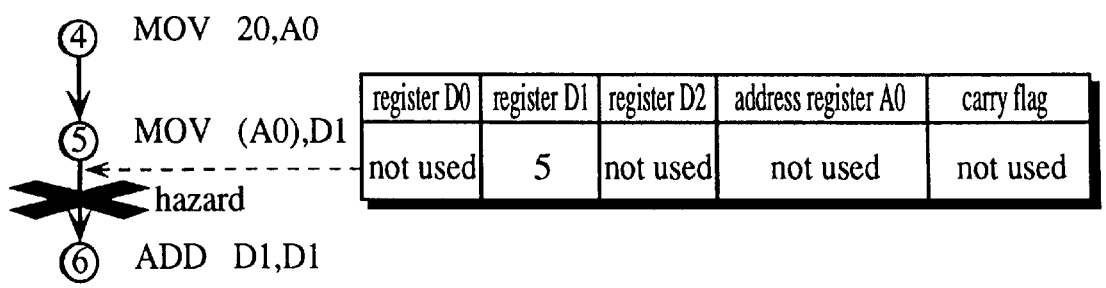

Fig. 13

|  |  |  | resource state |  |  |
|---|---|---|---|---|---|
|  |  |  | D0 | D1 | A0 |
| (a-1) | nominated output candidates | 1    4 | | | |
| (a-2) | selected instruction | 4  (hazard between descendant nodes) | | | |
|  | resource state | OK | N | N | N |
| (a-3) | instructions output to buffer | {4} | | | |
| (a-4) | updated resource state |  | N | N | 4 |
|  | recursive call(1st) | | | | |
| (b-1) | nominated output candidates | 1    5 | | | |
| (b-2) | selected instruction | 5  (hazard between descendant nodes) | | | |
| (b-3) | resource state | OK | N | N | 4 |
|  | instructions output to buffer | {4_5} | | | |
| (b-4) | updated resource state |  | N | N | N(last reference) |
|  | updated resource state |  | N | 5 | N(defined) |
|  | recursive call(2nd) | | | | |
| (c-1) | nominated output candidates | 1    6 | | | |
| (c-2) | selected instruction | 1  (#6 has hazard) | | | |
| (c-3) | resource state | OK | N | 5 | N |
|  | instructions output to buffer | {4_5_1} | | | |
| (c-4) | updated resource state |  | 1 | 5 | N(defined) |
|  | recursive call(3rd) | | | | |
| (d-1) | nominated output candidates | 2    6 | | | |
| (d-2) | selected instruction | 6 | | | |
| (d-3) | resource state | NG (but output due to last reference) | 1 | 5 | N |
|  | instructions output to buffer | {4_5_1_6} | | | |
| (d-4) | updated resource state |  | 1 | N | N(last reference) |
|  | updated resource state |  | 1 | 6 | N(defined) |
|  | recursive call(4th) | | | | |
| (e-1) | nominated output candidates | 2 | | | |
| (e-2) | selected instruction | 2 | | | |
|  | resource state | OK | 1 | 6 | N |
| (e-3) | instructions output to buffer | {4_5_1_6_2} | | | |
| (e-4) | last reference | | | | |
|  | updated resource state |  | N | 6 | N(last reference) |
|  | updated resource state |  | N | 6 | 2(defined) |
|  | recursive call(5th) | | | | |
| (f-1) | nominated output candidates | 3 | | | |
| (f-2) | selected instruction | 3 | | | |
| (f-3) | resource state | OK | N | 6 | 2 |
|  | instructions output to buffer | {4_5_1_6_2_3} | | | |
| (f-4) | updated resource state |  | N | 6 | N(last reference) |

Fig. 14

| | | | RESOURCE STATE | | | |
|---|---|---|---|---|---|---|
| | | | D0 | D1 | D2 | A0 |
| | initial state of basic block instructions output to buffer | \|\| | N | N | N | S |
| (s-1) | nominated output candidate | 1    4 | | | | |
| (s-2) | selected instruction | 4(hazard between descendant nodes) | | | | |
| (s-3) | resource state | OK | | | | |
| (s-4) | instructions output to buffer recursive call | \|4\| level 1 | 4 | N | N | S |
| (t-1) | nominated output candidate | 1    5 | | | | |
| (t-2) | selected instruction | 5(hazard between descendant nodes) | | | | |
| (t-3) | resource state | NG(#5 defines A0) | | | | |
| (t-4) | selected instruction resource state | 1(no other candidate) NG(#1 defines D0) | | | | |
| | back-track restore previous state nominated output candidate recursive call | (no candidate) <br> \|\| (#4 deleted) level 0 | N | N | N | S |
| (u-2) | selected instruction | 1(no other candidate) | | | | |
| (u-3) | nominated output candidate recursive call | \|1\| level 1 | 1 | N | N | N |
| (v-1) | nominated output candidate | 2    4 | | | | |
| (v-2) | selected instruction resource state | 4(hazard between descendant nodes) NG(#4 defines D0) | | | | |
| (v-3) | selected instruction resource state | 2(no other candidate) OK | | | | |
| (v-4) | instructions output to buffer recursive call | \|1_2\| level 2 | N | N | 2 | N |
| | nominated output candidate | 3    4 | | | | |
| (w-2) | selected instruction instructions output to buffer recursive call | 4(hazard between descendant nodes) \|1_2_4\| level 3 | 4 | N | 2 | N |
| | nominated output candidate selected instruction instructions output to buffer instructions output to buffer | 3    5 5(hazard between descendant nodes) \|1_2_4_5\| level 4 | N | N | 2 | 5 |
| | nominated output candidat selected instruction instructions output to buffer instructions output to buffer | 3    6 6(hazard between descendant nodes) \|1_2_4_5_6\| level 5 | N | 6 | 2 | N |
| | nominated output candidate selected instruction instructions output to buffer recursive call | 3    7 3(hazard between #6-#7) \|1_2_4_5_6_3\| level 6 | N | 6 | N | N |
| | nominated output candidate selected instruction instructions output to buffer recursive call | 7 7(no other candidate) \|1_2_4_5_6_3_7\| all instructions output | N | 7 | N | N | present assembler source codes

|   |     |           | size | cycle |         |
|---|-----|-----------|------|-------|---------|
|(1)| MOV | mem_a, D0 | 3    | 1     |         |
|(2)| ADD | 10, D0    | 2    | 1     | hazard +1cycle |
|(3)| MOV | D0, mem_a | 3    | 1     |         |
|(4)| MOV | mem_b, D0 | 3    | 1     |         |
|(5)| ADD | 20, D0    | 2    | 1     | hazard +1cycle |
|(6)| MOV | D0, mem_b | 3    | 1     |         |

16bytes   8cycles

DAGs before register replacement

DAGs after register replacement

① MOV mem_a, D0

② ADD 10, D0

③ MOV D0, mem_a

④ MOV mem_b, D1

⑤ ADD 20, D1

⑥ MOV D1, mem_b instruction sequence after instruction scheduling with above DAGs

|  |  |  | size | cycle |
|---|---|---|---|---|
| (1) | MOV | mem_a, D0 | 3 | 1 |
| (4) | MOV | mem_b, D1 | 3 | 1 |
| (2) | ADD | 10, D0 | 2 | 1 |
| (3) | MOV | D0, mem_a | 3 | 1 |
| (5) | ADD | 20, D1 | 2 | 1 |
| (6) | MOV | D1, mem_b | 3 | 1 |
|  |  |  | 16bytes | 6cycles |

OPTIMIZATION APPARATUS FOR REMOVING HAZARDS BY ARRANGING INSTRUCTION ORDER

BACKGROUND OF THE INVENTION (1). Field of the Invention

This invention relates to an optimization apparatus for arranging the order of instructions executed in machine-language programs and securing optimum orders of instructions.

(2). Description of the Prior Art

Recently, a lot of studies of pipeline processing have been made in the field of micro computer systems. The pipeline processing realizes high-speed processing by executing instructions of a machine-language program in parallel which are divided into a plurality of stages.

First, how instructions in machine-language programs are executed in pipeline processing in parallel are described with reference to FIG. 1.

In FIG. 1, the instructions, "MOV mem,D0", "MOV 10,D1", and "ADD D0,D0" are executed in a downward order. The five rectangles on the right-hand side of the instructions represent stages, "IF", "DEC", "EX", "MEM", and "WB", whose order of execution is indicated by the sideways white arrows.

At "IF" stage, an instruction is fetched; "DEC" stage, the instruction is decoded; "EX" stage, the instruction is executed; "MEM" stage, data is read/written from/into a memory; and "WB" stage, data is written into a register.

As shown in FIG. 1, each instruction starts processing after being delayed by one stage from the previous instruction.

The instructions of FIG. 1 are executed without any problems since there is no relationship of dependence between the consecutive instructions. Different resources are used in each combination of consecutive instructions, "MOV mem,D0"–"MOV 10, D1" and "MOV 10,D1"–"ADD D0,D0".

On the other hand, there will be a problem when there is a relationship of dependence between consecutive instructions, for example, when an execution result of a previous instruction is referred to by a current instruction for an Arithmetic Logic Unit (ALU) operation or an address operation. A "resource" represents a hardware element such as a register, a memory, or a flag such as a zero flag or a carry flag which can store data. Storing a value in a resource is called a "definition" of a resource, and using a value stored in a resource is called a "reference" of a resource.

FIG. 2 shows instructions that cause a problem.

As shown in the figure, "EX" stage and after of instruction "ADD D0,D0" delays by one stage cycle. This is because to execute stage "EX" of instruction "ADD D0,D0", an execution result of instruction "MOV mem,D0" is required. The execution result is obtained at stage "MEM" of instruction "MOV mem,D0", which is at the same stage cycle as stage "EX" of instruction "ADD D0,D0".

As understood from this example, when a load instruction such as instruction "MOV mem,D0" comes before an ALU operation instruction such as instruction "ADD D0,D0" which requires the execution result of the load instruction, a delay of one stage may happen. Such a phenomenon is called a hazard. A hazard may happen in case of other ALU operation instructions such as MUL, SUB, and DIV, and also with an address operation. Note that what kinds of instruction sequences cause hazards are determined by the pipeline structure. For example, the present pipeline has five stages.

An instruction scheduling is a conventional method for overcoming execution delays due to the hazard. In the instruction scheduling, an instruction order is changed so that one or more instructions are inserted between hazard-generating instructions to remove the hazards.

In this method, instructions are required to be rearranged by taking care not to change the execution results. For this purpose, Directed Acyclic Graphs (DAGs) are used in the instruction scheduling. The DAG stores information of dependence between instructions.

A conventional DAG comprises nodes (instruction nodes) and links (edges) which connect the nodes. A node is an instruction in the machine-language program. Links are set so that the order of the linked instructions is protected. The link is divided into three types: a link between a definition and a reference; a link between a reference and a definition; and a link between a definition and a definition.

(a) A link between a definition and a reference

The link between a definition and a reference indicates a relation between an instruction that defines a resource and an instruction that refers to the resource.

MOV 100,D0 . . . (1)

ADD D0,D1 . . . (2)

In the above example of the link, data flows via register D0. The data is not correctly transferred if the above instructions are replaced with each other. Therefore, the order is maintained through the execution of the instruction scheduling.

(b) A link between a reference and a definition

The link between a reference and a definition indicates a relation between an instruction that refers to a resource and an instruction that defines the resource.

MOV 100,D0 . . . (1)

ADD D0,D1 . . . (2)

MOV 200,D0 . . . (3)

ADD D0,D2 . . . (4)

In the above example of the link, a data flow via register D0 exists between (1) and (2); and a data flow via register D0 between (3) and (4). Suppose initial values of registers D1 and D2 are both zero. Then, if the above instructions are rearranged in order of (1)–(3)–(2)–(4), the data is not correctly transferred although the order satisfies the linking condition described in (a). 200 is added to respective values in registers D1 and D2. Therefore, the order of instructions of (2) and (3) is maintained through the execution of the instruction scheduling.

(c) A link between a definition and a definition

The link between a definition and a definition indicates a relation between an instruction that defines a resource and an instruction that defines the resource.

MOV 100,D0 . . . (1)

MOV 200,D0 . . . (2)

ADD D0,D2 . . . (3)

In the above example of the link, a data flow via register D0 exists between (2) and (3). Therefore, the instructions of (2) and (3) are connected by a link between a definition and a reference. If the above instructions are rearranged in order of (2)–(1)–(3), the data is not correctly transferred. 100 is added to a value in registers D2. Therefore, the order of instructions of (1) and (2) is maintained through the execution of the instruction scheduling.

Note that consecutive definitions such as in the above instruction sequence, (1)–(2), are rare in assembler-language programs. However, in a compilation by a compiler from a high-level language program to a machine-language program, an assembler language program which includes such consecutive definitions may be output. Also, consecutive definitions of flags are often seen.

A conventional optimization apparatus refers to conventional DAGs to maintain the data flows when executing instruction scheduling. This is described with reference to FIGS. 3A and 3B.

First, the conventional optimization apparatus divides a machine-language program into basic blocks by detecting jump instructions and jump target labels so that the basic blocks do not include any jump instructions. FIG. 3(a) shows a basic block comprising seven instructions. FIG. 3(a) indicates that a hazard occurs when instructions 5 and 6 are consecutively executed. Instructions 1, 2, and 3 are linked to form a DAG, and instructions 4, 5, 6, and 7 are linked to form another DAG.

Then, the conventional optimization apparatus rearranges the instructions to remove the hazard, taking care to maintain the links of the DAGs. As a result, as shown in FIG. 3(b), instruction 1 is inserted between instructions 5 and 6, and instructions 2 and 3 are placed after instruction 7.

Note that the above instructions can also be rearranged to 4–1–5–2–6–7–3, 1–4–5–2–6–7–3, etc., as far as the dependence between instructions stored in the DAGs are maintained.

However, the conventional method has a problem. Since the conventional method uses three kinds of dependence to form DAGs, nodes are easily connected, and possibilities for rearranging instructions are narrowed. In such a case, even if the basic block includes a hazard, the hazard cannot be removed. This is described with reference to FIG. 4.

FIG. 4 shows a basic block whose all instructions are linked in sequence in a DAG. FIG. 4 indicates that a hazard occurs between instructions "MOV (A0),D1" and "ADD D1,D1". However, no other instruction cannot be inserted between the instructions since all the instructions are linked by dependence. In such a case, the hazard cannot be removed.

SUMMARY OF THE INVENTION

It is therefore an object of the present invention to provide an optimization apparatus for removing hazards in pipeline processing by rearranging instructions.

It is another object of this invention to provide an optimization apparatus for removing the hazards with neither DAGs of reference-definition dependence nor those of definition-definition dependence.

It is still another object of this invention to provide an optimization apparatus for removing delays in pipeline processing by rearranging instructions for each program segment, wherein the delays occur since a resource defined by a load instruction is referred to by the succeeding ALU operation or address operation.

The above objects are fulfilled by an optimization apparatus for removing hazards from a program by rearranging instructions for each program segment, wherein each program segment does not include any jump instruction nor any jump target label, comprising: a Directed Acyclic Graph (hereinafter DAG) generating means for generating a plurality of DAGs for each program segment, the DAG showing relation between the instructions by parent-to-child relation wherein the parent instructions define resources and the child instructions refer to the resources; a hazard marking means for marking hazard-including combinations of a parent instruction and a child instruction in the DAGs for hazard; and a rearranging means for rearranging the instructions for each program segment so that instructions are inserted between the instructions of each marked combination, wherein the inserted instructions do not destroy values stored in resources used by the instructions of the marked combination.

With such a construction, dependence between instructions is represented by only definition-reference DAGs, and instructions are rearranged by taking care values stored in used resources are not destroyed. As a result, there is more room for rearranging the instructions. Therefore, hazards are removed with higher ratios, and machine-language programs appropriate for the pipeline processing are produced.

The optimization apparatus may further comprise: a priority assigning means for assigning a higher priority to a top instruction of a DAG whose descendant instructions include a hazard, and assigning a lower priority to a top instruction of a DAG whose descendant instructions do not include a hazard, wherein descendant instructions of a top instruction are instructions in the DAG which are traced from the top instruction through parent-to-child relations directly or indirectly; and wherein the rearranging means comprises: an extracting means for extracting a selected top instruction from the DAGs; an instruction storage means for storing the extracted instructions serially in order of extraction; a destructive instruction detecting means for detecting, as a destructive instruction, a top instruction of a DAG that destroys a value stored in a resource to be referred to later by another instruction in program segments; a marked instruction detecting means for detecting a top instruction of a DAG whose parent instruction is a last instruction in the instruction storage means, and which makes up a marked combination with the parent instruction; an extraction prohibiting means for prohibiting the extracting means from extracting the destructive instruction and the instruction detected by the marked instruction detecting means; and an instruction selecting means for selecting a top instruction of a DAG which has highest priority and which is not prohibited by the extraction prohibiting means, wherein the extracting means extracts the selected top instruction, and the rearranging means repeats operations of the extracting means through the instruction selecting means until a last instruction of a program segment is extracted, and wherein the optimization apparatus obtains rearranged instructions for the program segment from the instruction storage means.

With such a construction, since the extraction prohibiting means prohibits the extracting means from extracting the destructive instructions and the instruction detected by the marked instruction detecting means, and one or more instructions are inserted between the instructions of the combinations, hazards are removed with higher ratios. It is also secured by assigning priorities to instructions based on the presence of hazard.

The optimization apparatus may further comprise: a resource flag storage means for storing resource flags which correspond to resources, wherein a resource flag is set to "ON" when the corresponding resource is used in a program segment, and is set to "OFF" when the corresponding resource is not used, wherein an initial state of resource flags of the program segment reflects a final state of those of a preceding program segment; and an updating means for updating the resource flags each time an instruction is stored in the instruction storage means by setting a resource flag to "ON" when a corresponding resource is defined by the instruction and is referred to later by another instruction, and by setting a resource flag to "OFF" when a corresponding resource is referred to by the instruction as a last reference, wherein the destructive instruction detecting means refers to "ON" resource flags and judges whether a value stored in any of corresponding resources is destroyed by a top instruction.

With such a construction, whether each register is used is indicated by a corresponding flag. Therefore, hazards are removed with higher ratios.

The destructive instruction detecting means of the optimization apparatus may further comprise: a candidate nominating unit for nominating a top instruction of a DAG in a program segment as a destructive-instruction candidate; a resource flag checking unit for checking to see if all resource flags corresponding to resources defined by the destructive-instruction candidate are set to "OFF"; a first removing unit for removing the top instruction from the destructive-instruction candidate if the resource flag checking unit confirms that all the resource flags are set to "OFF"; a second parent instruction detecting unit for detecting all parent instructions of the destructive-instruction candidate if the resource flag checking unit confirms that at least one resource flag is set to s are set to "ON"; a second child instruction detecting unit for detecting all child instructions of the parent instructions detected by the second parent instruction detecting unit for each of the parent instructions; a second extraction judging unit for judging whether all of the child instructions detected by the second child instruction detecting unit, excluding the destructive-instruction candidate, have been extracted; a second removing unit for removing the top instruction from the destructive-instruction candidate when no child instruction other than the candidates is detected, or when the second extraction judging unit judges that all of the child instructions have been extracted; and an outputting unit for outputting the top instruction which has not been removed from the destructive-instruction candidate as the destructive-instruction to the extraction prohibiting means.

With such a construction, since an instruction having highest priority with the last reference is selected, an instruction using the same register for both a source register and a destination register, such as "add D1,D1", can be processed. Therefore, hazards are removed with higher ratios.

The rearranging means of the optimization apparatus may further comprise: a first restoring means for restoring the DAGs before an extraction of a last instruction in the instruction storage means if the destructive instruction detecting means detects all the top instructions of DAGs of the program segment as destructive instructions; and a second restoring means for causing resource flags corresponding to resources whose values have been changed by the last instruction to return to a state before the extraction of the last instruction; and wherein after the last instruction is returned to a DAG, the instruction selecting means selects an instruction with a priority next to that of the returned instruction.

With such a construction, the rearrangement of the instructions can be repeated until a correct instruction order is obtained.

Also, instructions can be rearranged without pre-loading an instruction. Therefore, the rearrangement of the instructions is simple and speedy.

Furthermore, since the back-track method prevents a stall in the rearrangement process, a total processing time can be set appropriately.

The above objects are also fulfilled by an optimization apparatus for removing hazards from a program by rearranging instructions for each program segment, wherein each program segment does not include any jump instruction nor any jump target label, comprising: a Directed Acyclic Graph (hereinafter DAG) generating means for generating a plurality of DAGs for each program segment, the DAG showing relation between the instructions by parent-to-child relation wherein the parent instructions define resources and the child instructions refer to the resources; a hazard marking means for marking hazard-including combinations of a parent instruction and a child instruction in the DAGs for hazard; a rearranging means for rearranging the instructions for each program segment so that instructions are inserted between the instructions of each marked combination, wherein the inserted instructions do not destroy values stored in resources used by the instructions of the marked combination; and a priority assigning means for assigning a higher priority to a top instruction of a DAG whose descendant instructions include a hazard, and assigning a lower priority to a top instruction of a DAG whose descendant instructions do not include a hazard, wherein descendant instructions of a top instruction are instructions in the DAG which are traced from the top instruction through parent-to-child relations directly or indirectly; and wherein the rearranging means comprises: an extracting means for extracting a selected top instruction from the DAGs; an instruction storage means for storing the extracted instructions serially in order of extraction; a destructive instruction detecting means for detecting, as a destructive instruction, a top instruction of a DAG that destroys a value stored in a resource to be referred to later by another instruction in program segments; a marked instruction detecting means for detecting a top instruction of a DAG whose parent instruction is a last instruction in the instruction storage means, and which makes up a marked combination with the parent instruction; a first resource selecting means for selecting resources which are not used in a data-flow section if the destructive instruction detecting means detects a destructive instruction, wherein the data-flow section ranges from the destructive instruction to a last instruction in the DAG that refers to the resource whose value is destroyed by the destructive instruction, wherein when the resource is defined again halfway, the data-flow section extends to a last reference of data of the re-defined resource; a first identifying means for identifying types of the resources selected by the first resource selecting means; a second identifying means for identifying types of instructions which either define or refer to the resources and a type of the destructive instruction; a second resource selecting means for selecting replacement-candidate resources from the resources selected by the first resource selecting means by making each combination of types of an instruction and a resource, comparing the combination with combination patterns stored in a processor, and excluding resources in combinations that do not match the combination patterns; a resource replacing means for replacing a resource defined by the destructive instruction by any of the replacement-candidate resources for each instruction with the resource in the data-flow section; an extraction prohibiting means for prohibiting the extracting means from extracting the instruction detected by the marked instruction detecting means and the destructive instruction whose resources have not been replaced by other resources by the resource replacing means; and an instruction selecting means for selecting a top instruction of a DAG which has highest priority and which is not prohibited by the extraction prohibiting means, wherein the extracting means extracts the selected top instruction, and the rearranging means repeats operations of the extracting means through the instruction selecting means until a last instruction of a program segment is extracted, and wherein the optimization apparatus obtains rearranged instructions for the program segment from the instruction storage means.

With such a construction, even if a register of highest-priority instruction is used, the register can be replaced by another free register. Therefore, a stall in the rearrangement is prevented and hazards are removed with higher ratios.

The above objects are also fulfilled by an optimization apparatus for removing delays in pipeline processing by rearranging instructions for each program segment, wherein the delays occur since a resource defined by a load instruction is referred to by any of an Arithmetic Logic Unit (hereinafter ALU) operation and an address operation both of which succeed to the load instruction, and wherein each program segment does not include any jump instruction nor any jump target label, comprising: a Directed Acyclic Graph (hereinafter DAG) generating means for generating a plurality of DAGs for each program segment, the DAG showing relation between the instructions by parent-to-child relation wherein the parent instructions define resources and the child instructions refer to the resources; a hazard marking means for marking an instruction sequence in which a resource defined by a load instruction is referred to by any of an ALU operation and an address operation both of which succeed to the load instruction; and a rearranging means for rearranging the instructions for each program segment so that instructions are inserted between the instructions of each marked instruction sequence, wherein the inserted instructions do not destroy values stored in resources used by the instructions of the marked instruction sequence.

With such a construction, even if a resource defined by a load instruction is used in the succeeding ALU operation or address operation, instructions are rearranged so that one or more instructions are inserted between the instructions. Therefore, hazards are removed with higher ratios.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows a hazard in the pipeline processing.

FIGS. 8A to 8C show resource state information.

FIG. 13 shows how scheduling unit 18 determines the order of instructions

FIG. 14 shows how scheduling unit 18 determines the order of the instruction by using the back-track.

DESCRIPTION OF THE PREFERRED EMBODIMENT <First Embodiment>

A preferred embodiment of the present invention is described below with reference to figures.

Figure 5:
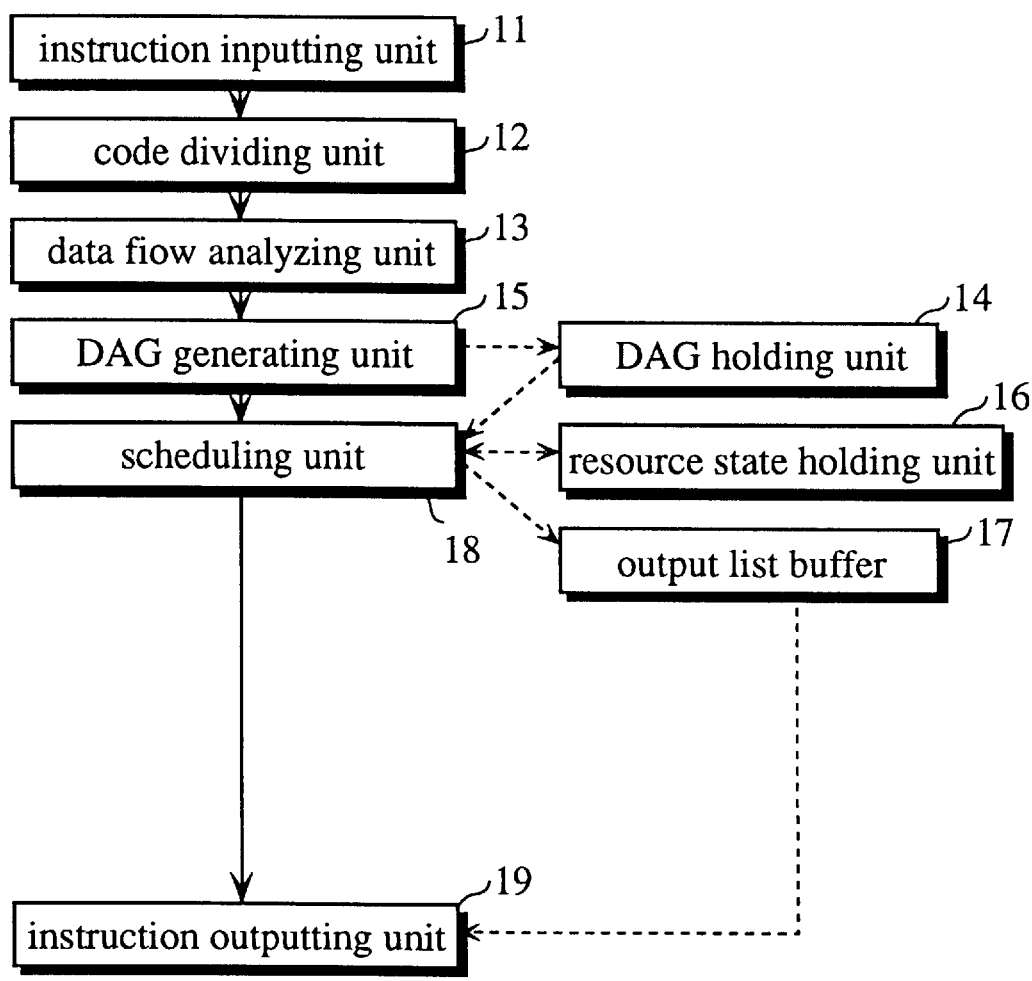
FIG. 5 is a block diagram showing a construction of the optimization apparatus of the present invention.

FIG. 5 is a block diagram showing a construction of an optimization apparatus of the present invention. The optimization apparatus comprises instruction inputting unit 11, code dividing unit 12, data flow analyzing unit 13, DAG holding unit 14, DAG generating unit 15, resource state holding unit 16, output list buffer 17, scheduling unit 18, and instruction outputting unit 19.

Instruction inputting unit 11 reads assembler source codes stored in units of files, and converts the codes to an intermediate codes written by intermediate language.

Code dividing unit 12 detects jump instructions in the file and divides the file into basic blocks based on the jump instructions and jump target labels.

Data flow analyzing unit 13 checks to see if there are active resources at the entrance and exit of each basic block. An active resource at the entrance is a resource that has been defined by the preceding basic block and is referred to by any instructions in the present basic block; and an active resource at the exit a resource that is defined in the present basic block and referred to by any instructions in the succeeding basic block.

Figure 6A:
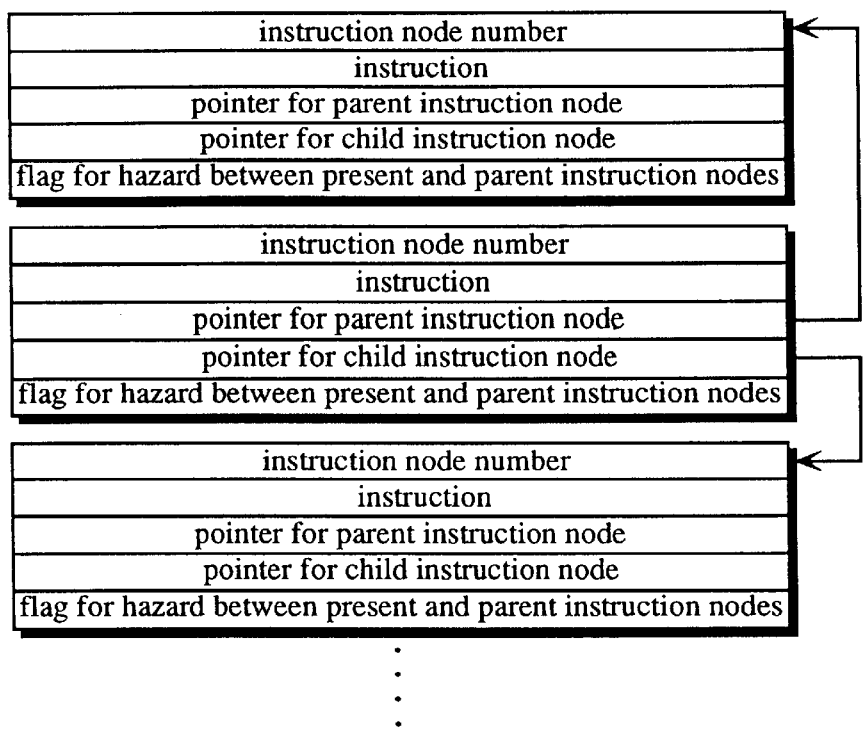
FIG. 6A shows a data structure of a DAG.

DAG holding unit 14 holds DAGs. As shown in FIG. 6A, each item, which corresponds to each instruction, of a DAG comprises an instruction node number, an instruction itself, a pointer for a parent instruction node, a pointer for a child instruction node, and a flag indicating whether a hazard exists between the present instruction node and the parent instruction node. A parent instruction node is an instruction node that defines a resource referred to by another instruction. A child instruction node is an instruction node that refers to a resource defined by another instruction. That is, parent instructions define resources and the child instructions refer to the resources. There may be more than one parent or child instruction node for a resource. Also, descendant instructions of a top instruction of a DAG are instructions in the DAG which are traced from the top instruction through parent-to-child relations directly or indirectly.

Figure 1:
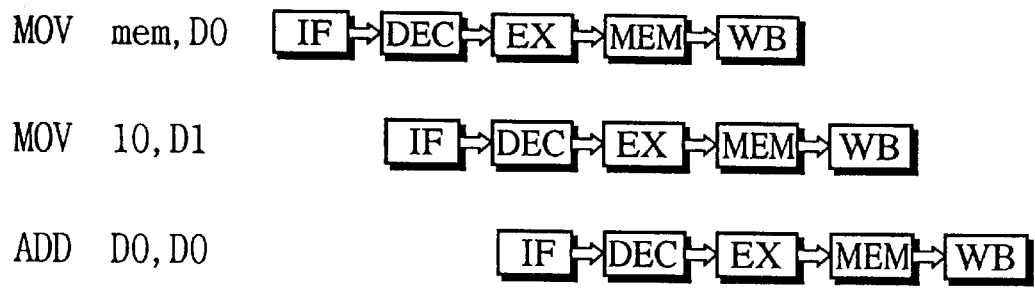
FIG. 1 shows how the pipeline processing is performed.
Figures 3A, 3B:
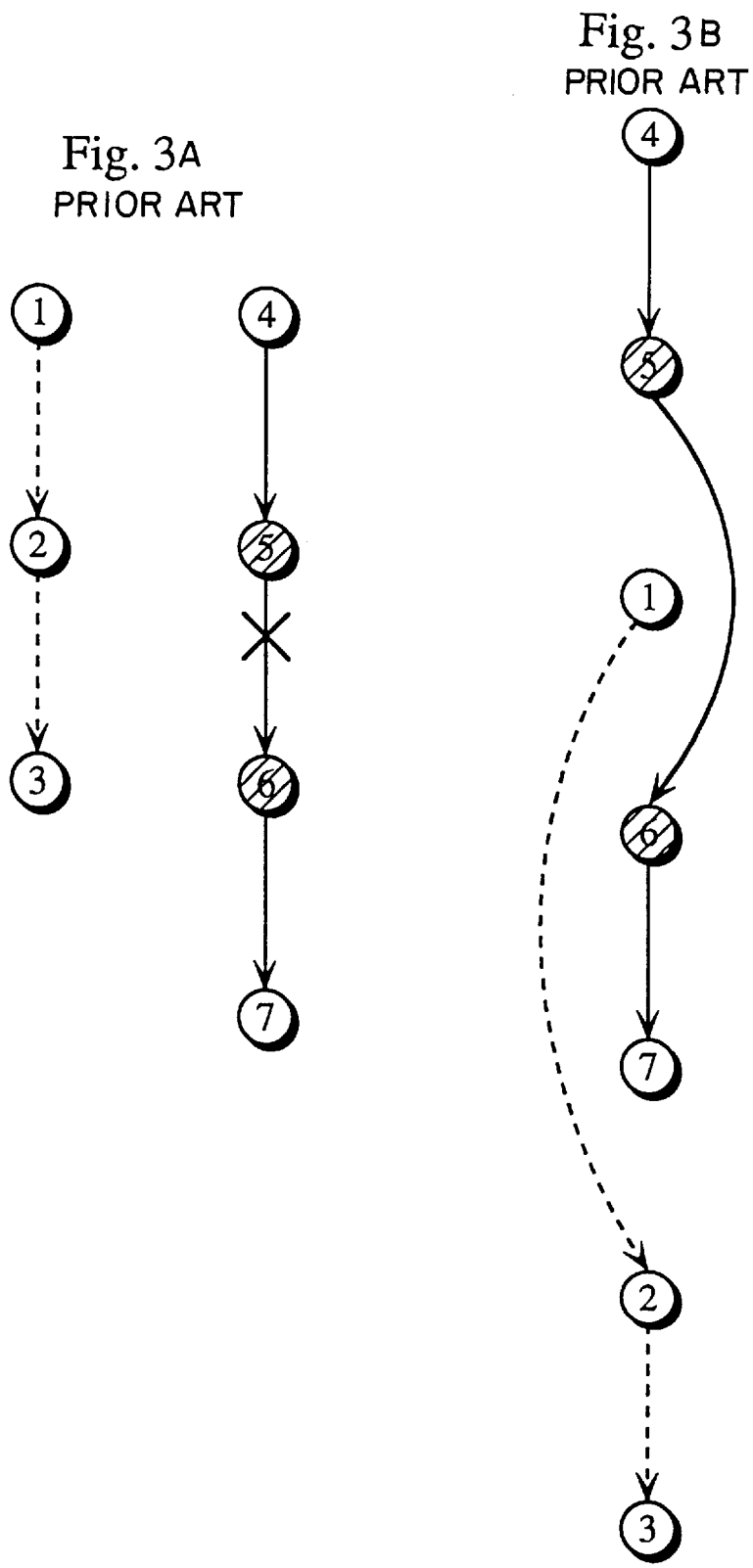
FIG. 3A and 3B shows a conventional instruction scheduling.
Figure 4:
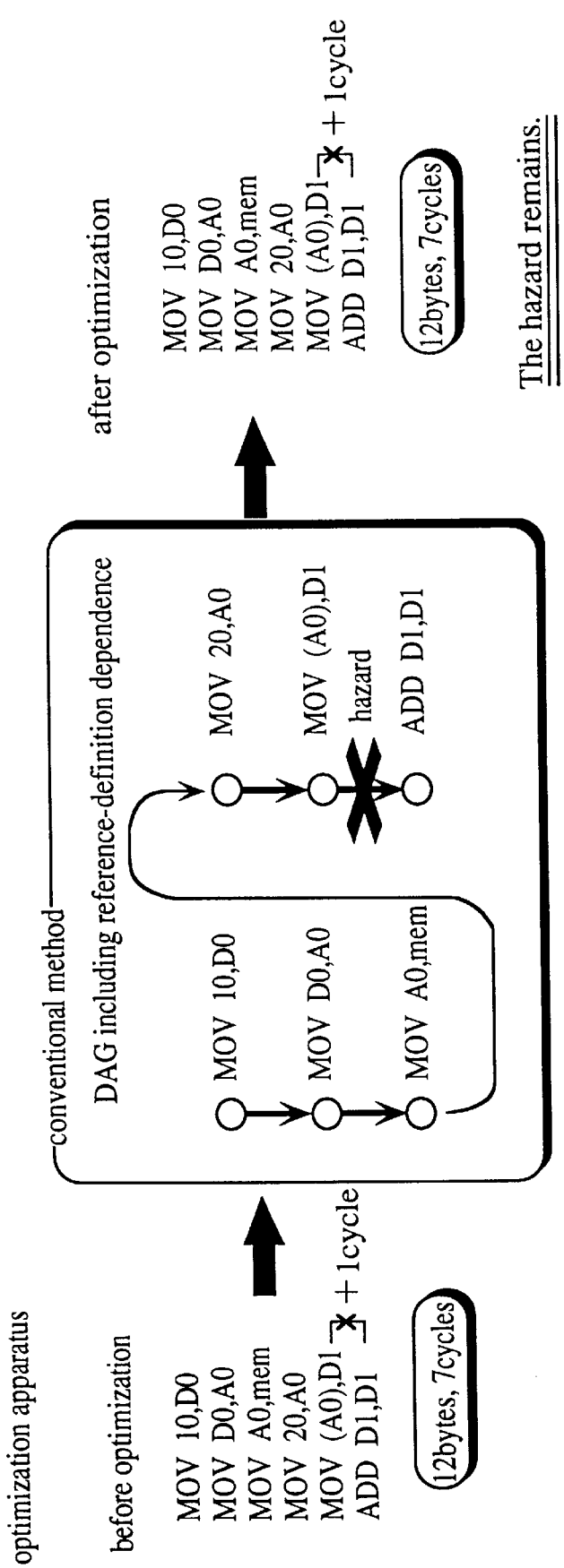
FIG. 4 shows a DAG linking all the instructions in a basic block.
Figure 6B:
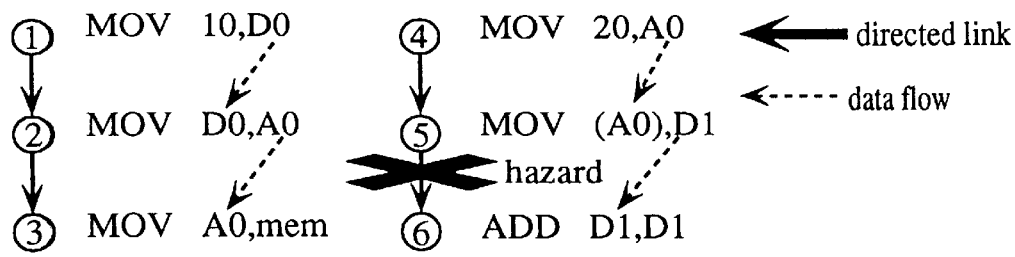
FIG. 6B shows a DAG used in First Embodiment.

FIG. 6B shows a DAG held by DAG holding unit 15. The DAG links the same instructions shown in FIG. 4, which includes a hazard between instructions 5 and 6. The broken-line arrows indicate data flows between resources. The DAG of the present embodiment differs from that of FIG. 4 in that it only links definition-reference, not reference-definition. As a result, instructions "MOV A0,mem" and "MOV 20,A0" are not linked. In this way, the dependence between instructions in the DAG of the present embodiment is looser than that of FIG. 4, that is, there is more room for rearranging the instructions.

Figure 6C:
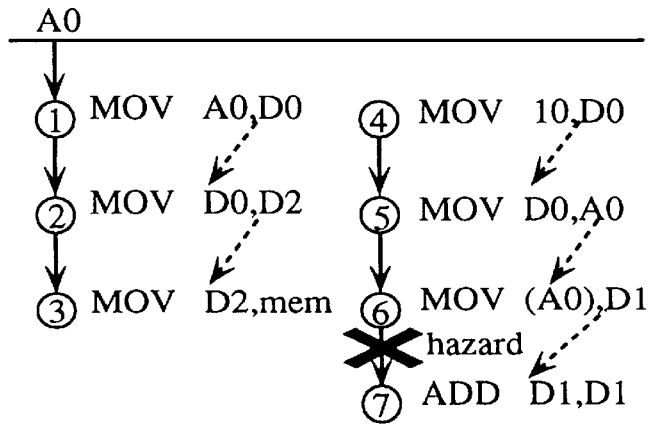
FIG. 6C shows a DAG used in First Embodiment.

FIG. 6C shows another DAG which has active resource, register A0, at the entrance.

DAG generating unit 15 generates DAGs by linking instructions with "definition-reference" relation, then, stores the DAGs in DAG holding unit 14.

Figure 7:
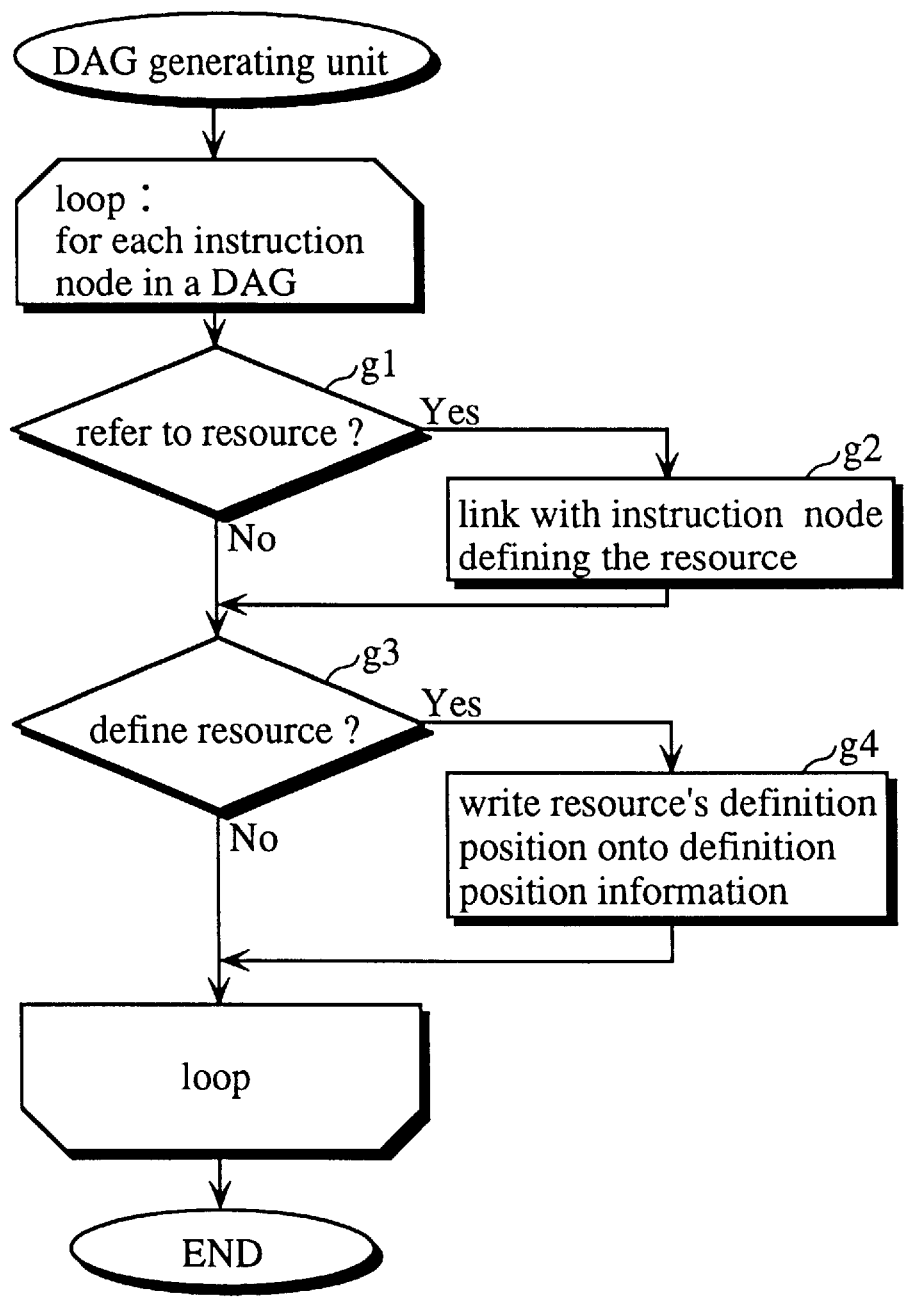
FIG. 7 is a flowchart of a DAG generation by DAG generating unit 14.

FIG. 7 is a flowchart showing how DAG generating unit 15 operates.

At step g1, it is judged whether an instruction node refers to a resource. If it does refer to a resource, the instruction node is linked with an instruction node that defines the resource at step g2. If not, or after step g2, it is judged whether the instruction node defines a resource at step g3. If a resource is defined a definition position of the resource is stored in a definition position information at step g4. Note that the definition position and the definition position information are not explained here since they are not relevant to the subject matter of the present invention. After the above steps are repeated for each instruction node in the basic block, DAGs are generated.

As understood from this flowchart, when a resource defined by an instruction node is not referred to by any instruction node and is overwritten by another definition, a definition-reference link is not generated.

DAG generating unit 15, then, detects each instruction node of ALU operation or address operation, and judges whether a resource referred to by the detected instruction node has been defined by a parent instruction node with a value read from a memory. If defined, DAG generating unit 15 sets a flag indicating the presence of a hazard between the instruction node and the parent instruction node.

Note that in First Embodiment, DAG generating unit 15 detects combinations of ALU operation or address operation instruction node and an instruction node that defines the resource referred to by the ALU operation or address operation instruction. This is because First Embodiment deals with a pipeline processing with five stages. Note that what kinds of instruction sequences DAG generating unit 15 detects are determined by the pipeline structure.

Resource state holding unit 16 holds resource state information. FIG. 8A shows an example of the resource state information. The resource state information indicates whether each resource is used. The information reflects the last instruction stored in output list buffer 17. The "used" means that the resource has been defined and is referred to by any succeeding instructions in the basic block; and "not used" means that the resource has not been defined, or that the resource has been defined but is not referred to by any succeeding instructions in the basic block. For example, suppose a resource is referred to by n succeeding instructions. Then, the resource remains to be "used" after the n−1 th instruction has been output, while the resource turns to be "not used" after the n th instruction has been output.

The upper items of FIG. 8A indicate resources, and the lower items indicates the states of the resources. "S" in the register D0 item indicates that register D0 has been defined by the preceding basic block and is used. "4" in the register D1 item indicates that register D1 has been defined by instruction 4 and is used.

FIG. 8B shows relation between the resource state information and instruction nodes 1, 2, and 3 shown in FIG. 6B. "1" in the register D0 item of the upper resource state information, which is made after instruction node 1 is executed, indicates that register D0 has been defined by instruction node 1 and is used. "2" in the register A0 item of the lower resource state information, that is made after instruction node 2 is executed, indicates that register A0 has been defined by instruction node 2 and is used. At this time, the register D0 item shows "not used" because instruction 2, which is the last instruction node to use the resource, has been output.

FIG. 8C shows relation between the resource state information and instruction nodes 4, 5, and 6 shown in FIG. 6B. "5" in the register D1 item of resource state information, that is made after instruction node 5 is executed, indicates that register D1 has been defined by instruction node 5 and is used. In this way, the resource state information shows the state of each resource at every output of instruction.

Output list buffer 17 stores instructions output by scheduling unit 18 in order of the output, thus rearranging the instructions in the file to be executed.

Scheduling unit 18 selects instructions based on the DAGs generated by DAG generating unit 15 and the resource state information held by resource state holding unit 16, then outputs the selected instructions one by one in order to output list buffer 17.

Instruction outputting unit 19 generates assembler source codes based on the results of scheduling unit 18, and outputs the generated assembler source codes.

Now, the instruction scheduling performed by scheduling unit 18 is described in detail with reference to the flowcharts of FIGS. 9 to 12.

Figure 9:
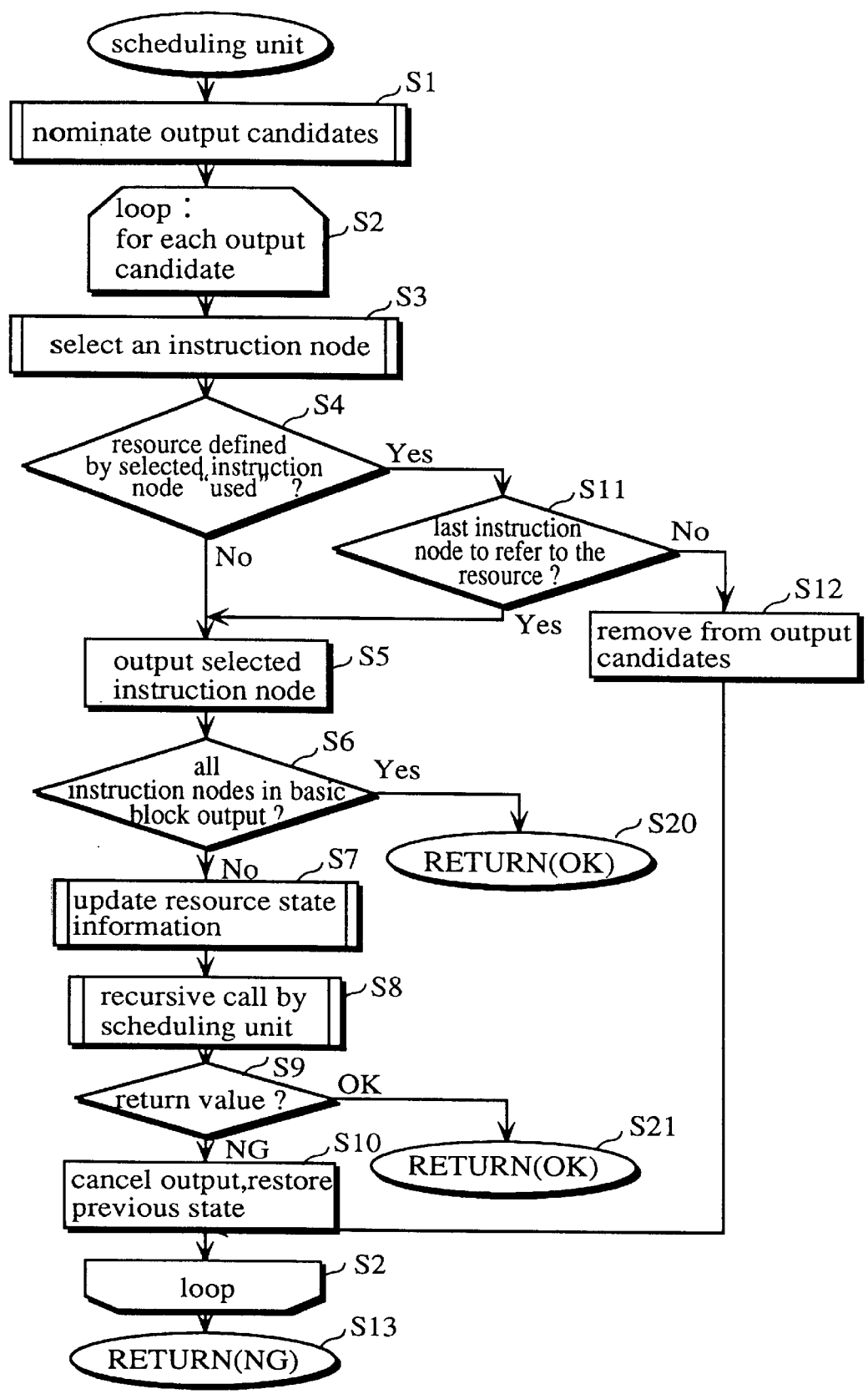
FIG. 9 is a main flowchart of the operation of scheduling unit 18.

1-0:

FIG. 9 is a main flowchart of scheduling unit 18.

At step S1, scheduling unit 18 nominates instruction nodes in a DAG as output candidates. At step S2, the loop ranging from step S3 to step S10 is controlled. At step S3, scheduling unit selects an instruction node among the candidates.

At step S4, scheduling unit 18 judges whether there is a resource defined by the selected instruction node. If not, the selected instruction node is output to output list buffer 17 at step S5.

If there is a resource defined, scheduling unit 18 refers to the resource state information. Then, if the resource is not being used, the selected instruction node is output at step S5.

If there is a resource defined, and the resource is used, it is judged whether the selected instruction node is the last instruction node to refer to the resource at step S11. If it is, the selected instruction node is output to output list buffer 17 at step S5. Note that the judgement at step S11 is done by checking to see if all the instruction nodes that refers to the resource defined by the selected instruction node have been output but one, and the remaining one is the selected instruction node. When a plurality of resources are defined by the selected instruction node, each defined resource is checked in the step.

After step S5, scheduling unit 18 judges whether all the instruction nodes have been output to output list buffer 17 at step S6: if not, it updates the resource state information at step S7; and if they are output, it returns to the start with an "OK" return value at step S20.

At step S11, if it is judged that the s elected instruction node is not the last reference, the instruction node is excluded from the candidates.

1-1:

After the resource state is updated at step S7, scheduling unit 18 performs a recursive call at step 8. Each time scheduling unit 18 performs a recursive call at step 8, steps S1 to S8 are repeated. During the process, based on the judgement at step S4, an instruction node is stored in output list buffer 17 at step S5. That is to say, as steps S1 to S8 are repeated by the recursive call, instructions are stored in output list buffer 17, each of the instructions reflecting the resource state at the time.

1-2:

At step S2, the loop ranging from step S3 to step S10 is controlled. The steps are repeated for each candidate nominated by scheduling unit 18. The loop may stop midway according to the judgement at step S4 or step S11. That is, the steps are repeated until an instruction node appropriate for the resource state is detected.

Figure 10:
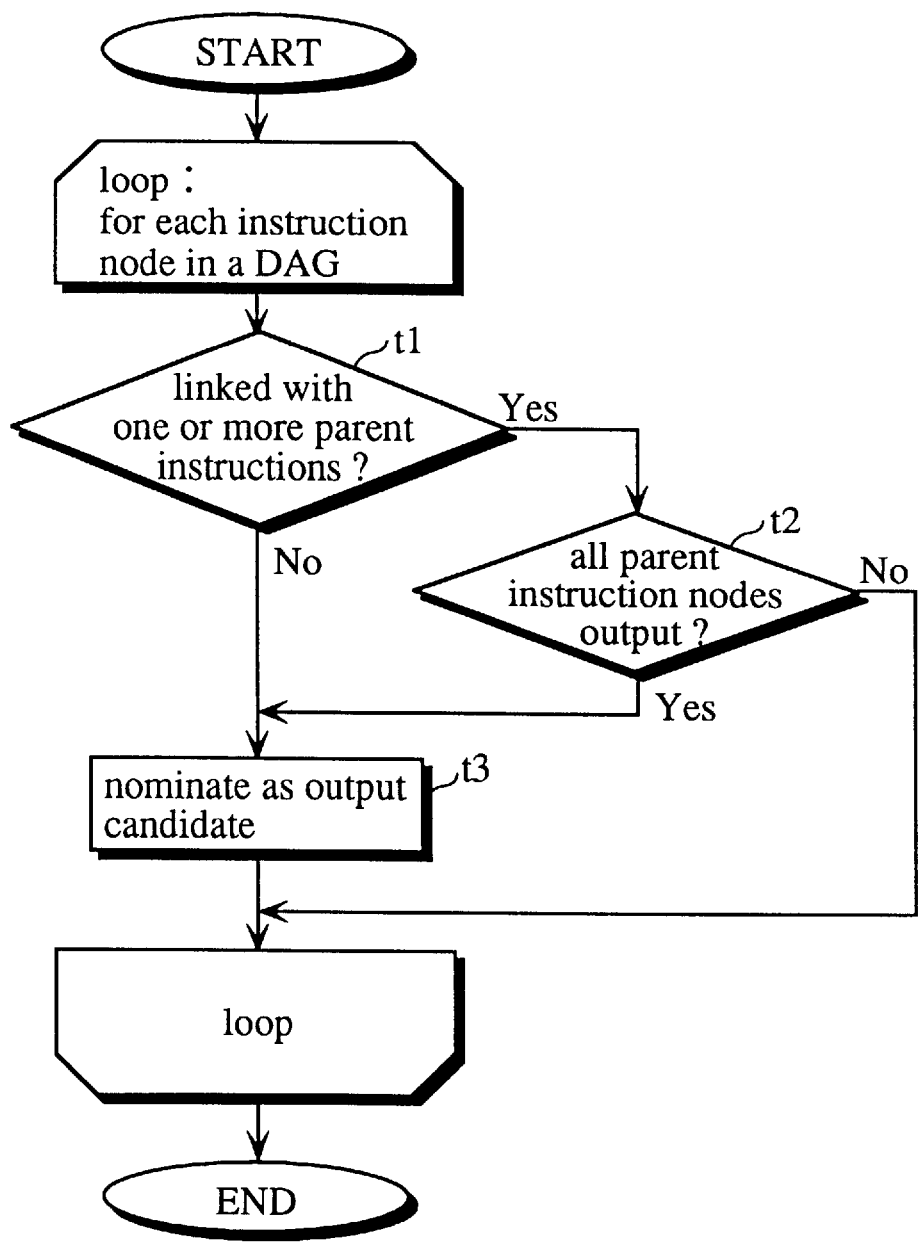
FIG. 10 is a flowchart of step S1 of the flowchart shown in FIG. 9.

1-3:

FIG. 10 is a sub-flowchart for step S1 of FIG. 9. At step S1, instruction nodes are nominated for output candidates by taking care to maintain dependence between instructions. At step t1, it is judged whether there is a link between an instruction node and its parent instruction node. In the case of the top instruction node of a DAG generated by DAG generating unit 15, it is judged that there is no link between the instruction and the parent instruction node. Then, the top instruction node is nominated for an output candidate.

At step t2, it is judged whether all parent instruction nodes of the instruction node have been output: if they have been output, the instruction node is nominated for an output candidate. This is done so that descendant instruction nodes are not output unless all the parent instruction nodes are output. As steps t1 and t2 are repeated, instruction nodes of the DAG are nominated for output candidates.

For example, in case of an instruction sequence including "MOV 50,D0", "MOV 20,D1", and "ADD D0,D1", "ADD D0,D1" should be output after "MOV 20,D0" and "MOV 50,D1" are output. This is because otherwise the dependence is broken. Therefore, at step t2 of "ADD D0,D1", it is judged whether "MOV 20,D1" and "MOV 50,D1" have been output already.

Figure 11:
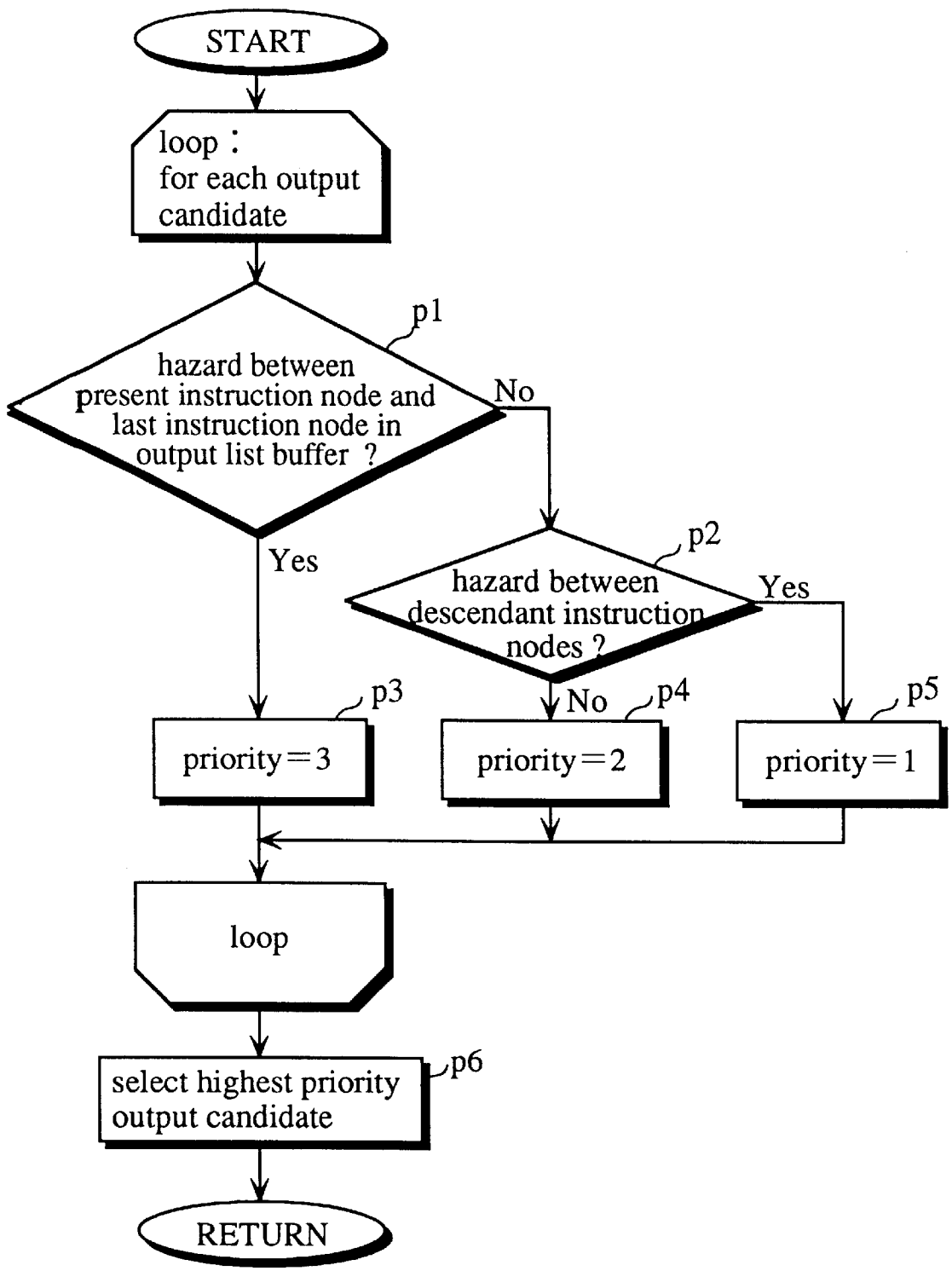
FIG. 11 is a flowchart of step S3 of the flowchart shown in FIG. 9.

1-4:

FIG. 11 is a sub-flowchart for step S3 of FIG. 9. At step S3, instruction nodes of a DAG are selected with their ranks by detecting a link including a hazard.

At step p1, it is judged whether a hazard exists between a candidate instruction node and its parent instruction node: if exists, it is judged whether the parent instruction node has been stored in output list buffer 17 immediately before the judgement. If stored, the instruction node receives rank 3 at step p3. If not, it is judged whether a hazard exists between descendant instruction nodes at step p2. If not, the instruction node receives rank 2 at step p4; and if a hazard exists rank 1 at step p5.

In this way, after the steps p1 to p5 are repeated for each candidate, each candidate has its rank. Then, at step p6, an instruction with the highest rank is selected.

Figure 12:
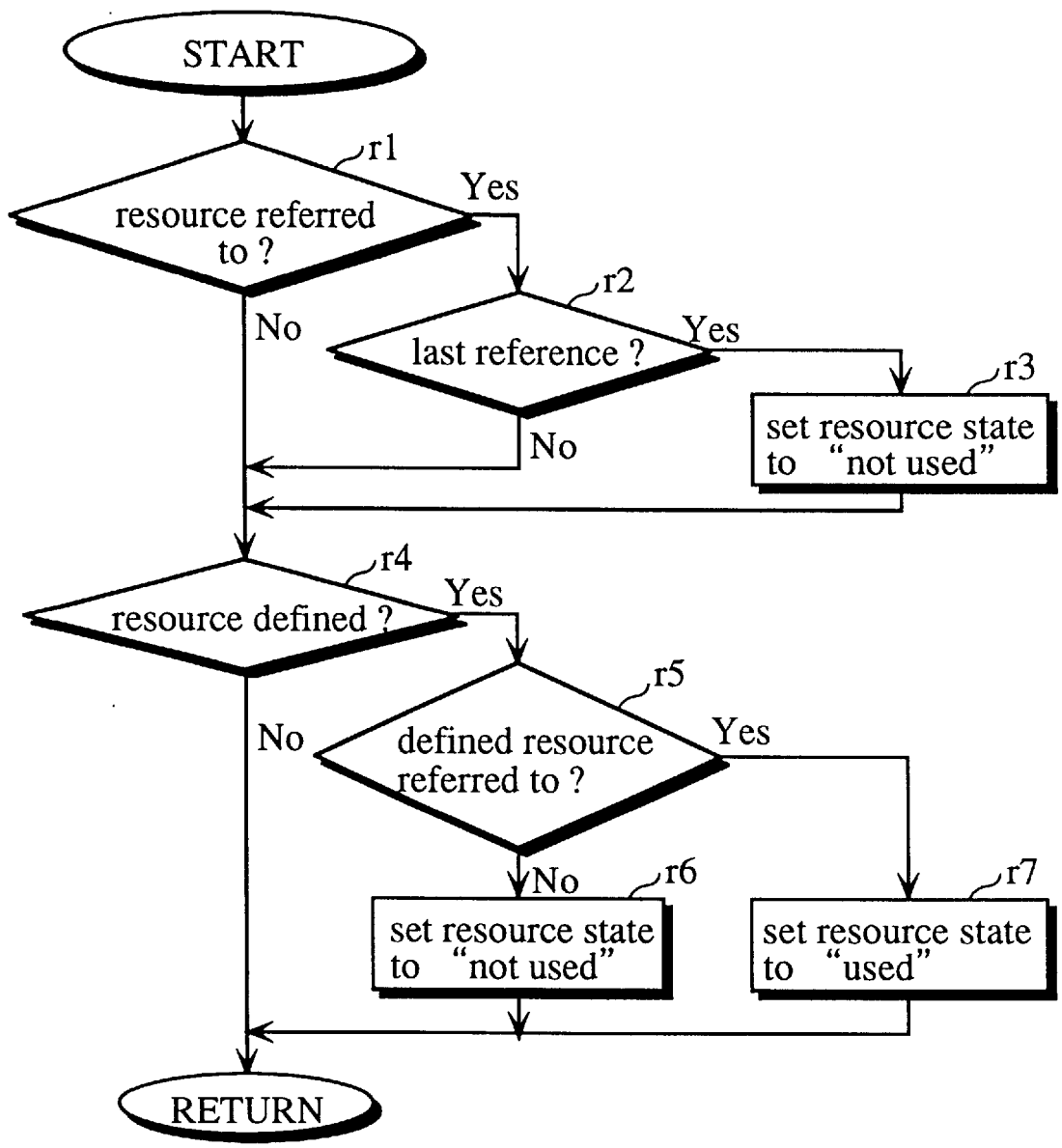
FIG. 12 is a flowchart of step S7 of the flowchart shown in FIG. 9.

1-5:

FIG. 12 is a sub-flowchart for step S7 of FIG. 9. At step S7, the resource state information is updated.

At step r1, it is judged whether an instruction node refers to one or more resources. If it refers to a resource, it is judged whether the references are the last references for each resource at step r2. More specifically, it is judged whether other child instruction nodes of a resource's parent instruction node have been output. If there has been an output, it is judged that the instruction node is the last reference for the resource at step r2.

Note that the steps of resource state information updating are performed for each resource shown in the output instruction node. For example, suppose the output instruction node is instruction node "ADD D0,D1." When the instruction is executed, first registers D0 and D1 are referred to, then register D1 is defined. Accordingly, at step r2, first it is judged whether register D0 is referred to by the instruction as the last reference, then it is judged whether register D1 is referred to by the instruction as the last reference.

At step r3, the resource state information is updated by setting the resource of the last reference to "not used". At step r4, it is judged whether the instruction node defines a resource. If it defines a resource, it is judged whether there are any child instruction nodes referring to the resource at step r5. If there are child instruction nodes, the resource state information is updated by setting the resource to "used". If no nodes are found at step r5, the resource state information is updated by setting the resource to "not used".

1-6:

When no instruction has been output to output list buffer 17 after all the candidate instruction nodes are checked for resource state through steps S1 to S12, scheduling unit 18 returns to step S9 with an "NG" return value at step S13. At step S9, it is judged whether the return value is "OK" or "NG": if "NG", the candidate instruction nodes are canceled, and the former state is resumed at step S10. Then, scheduling unit 18 repeats the steps for candidates nominated at step S1 of the preceding recursive call.

<Operation Example 1>

Now, an operation of the optimization apparatus of the present invention is described with reference to FIG. 13. FIG. 13 shows how scheduling unit 18 determines an order of the instructions in the DAG shown in FIG. 6B. On the right-hand side of the figure, the resource state information is provided. For convenience's sake, only data registers D0, D1, and an address register A0 are shown in the figure, and memories and flags are not shown.

In FIG. 13, "candidates" item provides serial numbers of instruction nodes, "instruction selection" item a serial number of instruction node selected at step S3, "resource state" item the resource state at judgement of step 4, "output buffer" the order instruction nodes stored in output list buffer 17, "resource update" item the updated resource state after the instruction node is output to output list buffer 17, and "recursive call" item the number of times the recursive call is performed.

The following are detailed description of the operation divided into stages (a-1) to (f-4), with corresponding steps of FIGS. 9 to 12.

(a-1):

Scheduling unit 18 is activated for the DAG of FIG. 6B which is generated by DAG generating unit 15 and held by DAG holding unit 14. Since instruction nodes 1 and 4 are both top instruction nodes, having no link with parent instruction nodes (step t1), they are nominated for output candidates (step t3).

(a-2):

Instruction node 4 receives rank 1 since a descendant instruction node has a hazard (step p5). Instruction node 1 receives rank 2 since no descendant instruction node has a hazard (step p4). As a result, instruction node 4 is selected as an output candidate because it has the highest rank 1 (step p6).

(a-3), (a-4):

Scheduling unit 18 refers to the resource state information to judge whether a resource defined by the selected instruction node is used (step S4). At this stage, since all the resources are "not used", instruction node 4 is output to output list buffer 17 (step S5). Then, scheduling unit 18 judges whether all the instruction nodes have been output to output list buffer 17 (step S6). At this stage, they have not been output. Therefore, the resource state information is updated, that is, register A0 defined by instruction node 4 is set to "used" (step S7). Then, the first recursive call is performed (step S8).

(b-1):

Since instruction node 1 is a top instruction node, having no link with the parent instruction node (step t1), it is nominated for an output candidate (step t3). Instruction node 5 is also nominated for an output candidate since the parent instruction node 4 has been output (steps t2 and t3).

(b-2):

Instruction node 5 receives rank 1 since a descendant instruction node has a hazard (step p5). Instruction node 1 receives rank 2 since no descendant instruction node has a hazard (step p4). As a result, instruction node 5 is selected as an output candidate because it has the highest rank 1 (step p6).

(b-3), (b-4):

Scheduling unit 18 refers to the resource state information to judge whether a resource defined by the selected instruction node is used (step S4). Since register D1 is "not used", instruction node 5 is output to output list buffer 17 (step S5). Then, since all the instruction nodes have not been output to output list buffer 17 (step S6), the resource state information is updated, that is, register A0 having had the last reference is set to "not used" (step S7). Then, the second recursive call is performed (step S8).

(c-1):

Instruction node 1 is again nominated for an output candidate (step t3). Instruction node 6 is nominated for an output candidate since the parent instruction node 5 has been output (steps t2 and t3).

(c-2):

Instruction node 6 receives rank 3 since a hazard exists between the instruction node and the parent instruction node 5, which is the latest output instruction node (step p3). Instruction node 1 receives rank 2 (step p4). As a result, instruction node 1 is selected as an output candidate because it has the highest rank (step p6).

(c-3), (c-4):

According to the resource state information at this stage (step S4), register D0 defined by instruction node 1 is "not used". Therefore, instruction node 1 is output to output list buffer 17 (step S5). Then, since all the instruction nodes have not been output to output list buffer 17 (step S6), the resource state information is updated, that is, register D0 is set to "used" (step S7). Then, the third recursive call is performed (step S8).

(d-1):

Instruction nodes 2 and 6 are nominated for output candidates since the respective parent instruction nodes 1 and 5 have been output (steps t2 and t3).

(d-2):

Instruction node 2 receives rank 2 since there is no hazard between the instruction node and the preceding output instruction node, nor has any descendant instruction node a hazard (step p4). Also, instruction node 6 receives rank 2 for the same reason (step p4). While either of instruction nodes 2 and 6 can be selected as an output candidate since they have the same rank, it is supposed that instruction node 6 is selected here (step p6).

(d-3), (d-4):

According to the resource state information at this stage (step S4), register D1 defined by instruction node 6 is "used" since it is defined by instruction node 5. However, since instruction node 6 is the last reference of register D1 defined by instruction node 5 (step S11), instruction node 6 is output to output list buffer 17 (step S5). Then, since all the instruction nodes have not been output to output list buffer 17 (step S6), the resource state information is updated, that is, register D1 defined by instruction node 6 is set to "used" (step S7). Then, the fourth recursive call is performed (step S8).

(e-1):

Instruction node 2 is nominated for an output candidate since the parent instruction node 1 has been output (steps t2 and t3).

(e-2):

Instruction node 2 receives rank 2 since there is no hazard between the instruction node and the preceding output instruction node, nor has any descendant instruction node a hazard (step p4). Instruction node 2 is selected as an output candidate since there is no other candidate.

(e-3), (e-4):

According to the resource state information at this stage (step S4), register A0 defined by instruction node 2 is "not used". Therefore, instruction node 2 is output to output list buffer 17 (step S5). Then, since all the instruction nodes have not been output to output list buffer 17 (step S6), the resource state information is updated, that is, register D0 of the last reference is set to "not used" (step S7). Then, the fifth recursive call is performed (step S8).

(f-1):

Instruction node 3 is nominated for an output candidate since the parent instruction node 2 has been output (steps t2 and t3).

(f-2):

Instruction node 3 receives rank 2 since there is no hazard between the instruction node and the preceding output instruction node, nor has any descendant instruction node a hazard (step p4). Instruction node 3 is selected as an output candidate since there is no other candidate.

(f-3), (f-4):

According to the resource state information at this stage (step S4), resource "mem" (not shown) defined by instruction node 3 is "not used". Therefore, instruction node 3 is output to output list buffer 17 (step S5). Then, since all the instruction nodes of the basic block have been output to output list buffer 17, scheduling unit 18 returns to the start (steps S6 and S20).

The instructions have been rearranged and stored in output list buffer 17 in order of 4–5–1–6–2–3, that is, in order of "MOV 20,A0", "MOV (A0),D1", "MOV 10,D0", "ADD D1,D1", "MOV D0,A0", and "MOV 10,mem". Before this rearrangement, the underlined instructions were consecutive, having a hazard in between. They are separated now, and the hazard has been removed. <Operation Example 2>

Now, another operation of the optimization apparatus of the present invention is described with reference to FIG. 14. FIG. 14 shows how scheduling unit 18 determines an order of the instructions in the DAG shown in FIG. 6C by using a back-track (return). On the right-hand side of the figure, the resource state information is provided. For convenience's sake, only data registers D0, D1, and D2 and an address register A0 are shown in the figure, and memories and flags are not shown.

In FIG. 14, "recursive call" item provides a level of the number of times the recursive call is performed.

The following are detailed description of the operation for stages (s-1) to (w-2), with corresponding steps of FIGS. 9 to 12.

(s-1):

Scheduling unit 18 is activated for the DAG of FIG. 6C which is generated by DAG generating unit 15 and held by DAG holding unit 14. Since instruction node 4 is a top instruction node, having no link with the parent instruction node (step t1), it is nominated for an output candidate (step t3). On the other hand, though instruction node 1 has a link with the parent instruction node or with the start of the basic block, scheduling unit regards the parent instruction node as having been output, and nominates the instruction node 1 for an output candidate (steps t2 and t3).

(s-2):

Instruction node 4 receives rank 1 since a descendant instruction node has a hazard (step p5). Instruction node 1 receives rank 2 since no descendant instruction node has a hazard (step p4). As a result, instruction node 4 is selected as an output candidate because it has the highest rank 1 (step p6).

(s-4):

Scheduling unit 18 refers to the resource state information to judge whether a resource defined by the selected instruction node is used (step S4). Since a resource defined by instruction node 4 is "not used", instruction node 4 is output to output list buffer 17 (step S5). Since all the instruction nodes have not been output to output list buffer 7 (step S6), the resource state information is updated, that is, register D0 defined by instruction node 4 is set to "used" (step S7). Then, level-1 recursive call is performed (step S8).

(t-1):

Since instruction node 1 is a top instruction node, having no link with the parent instruction node (step t1), it is nominated for an output candidate (step t3). Instruction node 5 is also nominated for an output candidate since the parent instruction node 4 has been output (steps t2 and t3).

(t-2):

Instruction node 5 receives rank 1 since a descendant instruction node has a hazard (step p5). Instruction node 1 receives rank 2 since no descendant instruction node has a hazard (step p4). As a result, instruction node 5 is selected as an output candidate because it has the highest rank 1 (step p6).

(t-3), (t-4):

Scheduling unit 18 refers to the resource state information to judge whether a resource defined by the selected instruction node is used (step S4). At this stage, register A0 defined by instruction node 5 is "used" ("S"), and instruction node 5 is not the last reference of register A0 for the definition indicated by "S". Therefore, instruction node 5 is not output to output list buffer 17 (step S4, S11, and S12). As a result, instruction node 1 is selected as an output candidate (step 2). However, since register D0 defined by instruction node 1 is "used", and instruction node 1 is not the last one to refer to register D0 for the definition indicated by "4" (step S4, S11, and S12), instruction node 1 is excluded from output candidates. Then, scheduling unit 18 returns to step S9 with an "NG" return value (step S13).

A former state when instruction node 4 has been output to output list buffer 17 and when instruction node 1 has been selected as an output candidate is resumed (step S10). Instruction node 4 stored in output list buffer 17 is canceled, and a former state when instruction node 4 has not been output is resumed (step 10). Then, scheduling unit 18 returns to step S2.

(u-2):

Instruction node 1 receives rank 2 since no descendant instruction node has a hazard (step p4). Instruction node 1 is selected as an output candidate because there is no other candidate (step p6).

(u-3):

Since register D0 defined by instruction node 1 is "not used", instruction node 1 is output to output list buffer 17 (step S5). The resource state information is updated, that is, register D0 defined by instruction node 1 is set to "used" (step S7), register A0 having had the last reference is returned to "not used". Then, level-1 recursive call is performed (step S8).

(v-1):

Instruction node 2 is nominated for an output candidate because the parent instruction node 1 has been output, and instruction node 4 is also nominated because it is a top node (steps t2 and t3).

(v-2):

Instruction node 2 receives rank 2 since there is no hazard between the instruction node and the preceding output instruction node, nor has any descendant instruction node a hazard (step p4). On the other hand, instruction node 4 receives rank 1 since it has a hazard (step p5). As a result, instruction node 4 is selected as an output candidate (step p6).

(v-3), (v-4):

Based on the resource state information at this stage (step S4), since instruction node 4 defines register D0, instruction node 4 is not output to output list buffer 17 (step S4, S11, and S12). Also, since instruction node 4 is not the last one to refer to register D0 defined by instruction node 1 (step S11), instruction node 4 is excluded from output candidates (step S12). Then, scheduling unit 18 returns to step S2.

Scheduling unit 18 refers to the resource state information for the other output candidate, instruction node 2 (step S4). According to the reference result, instruction node 2 is output to output list buffer 17 (step S5). Since all the instruction nodes have not been output (step S6), register D0 having had the last reference is returned to "not used", and register D2 defined by instruction node 2 is set to "used" (step S7). Then, level-2 recursive call is performed (step S8).

(w-2):

Instruction node 3 receives rank 2 since there is no hazard between the instruction node and the preceding output instruction node, nor has any descendant instruction node a hazard (step p4). Instruction node 4 receives rank 1 since a descendant instruction node has a hazard (step p5).

In this way, the above processes are repeated, and the instructions are stored in output list buffer 17 in order of 1–2–4–5–6–3–7.

As apparent from First Embodiment, the optimization apparatus of the present invention preserves dependence between instruction nodes with DAGs with only definition-reference links and resource state information taken from the last instruction stored in a buffer. As a result, there is more room for rearranging instructions. This increases the rate of removing hazards, assuring the generation of machine-language programs appropriate for pipeline processing.

<Second Embodiment>

Second Embodiment partly modifies First Embodiment. At step S11 of the First Embodiment, if it is judged that the selected instruction node is not the last reference, the instruction node is excluded from the candidates. Second Embodiment provides a chance for the instruction node to be output by replacing a resource in the instruction node by another resource.

Figure 15:
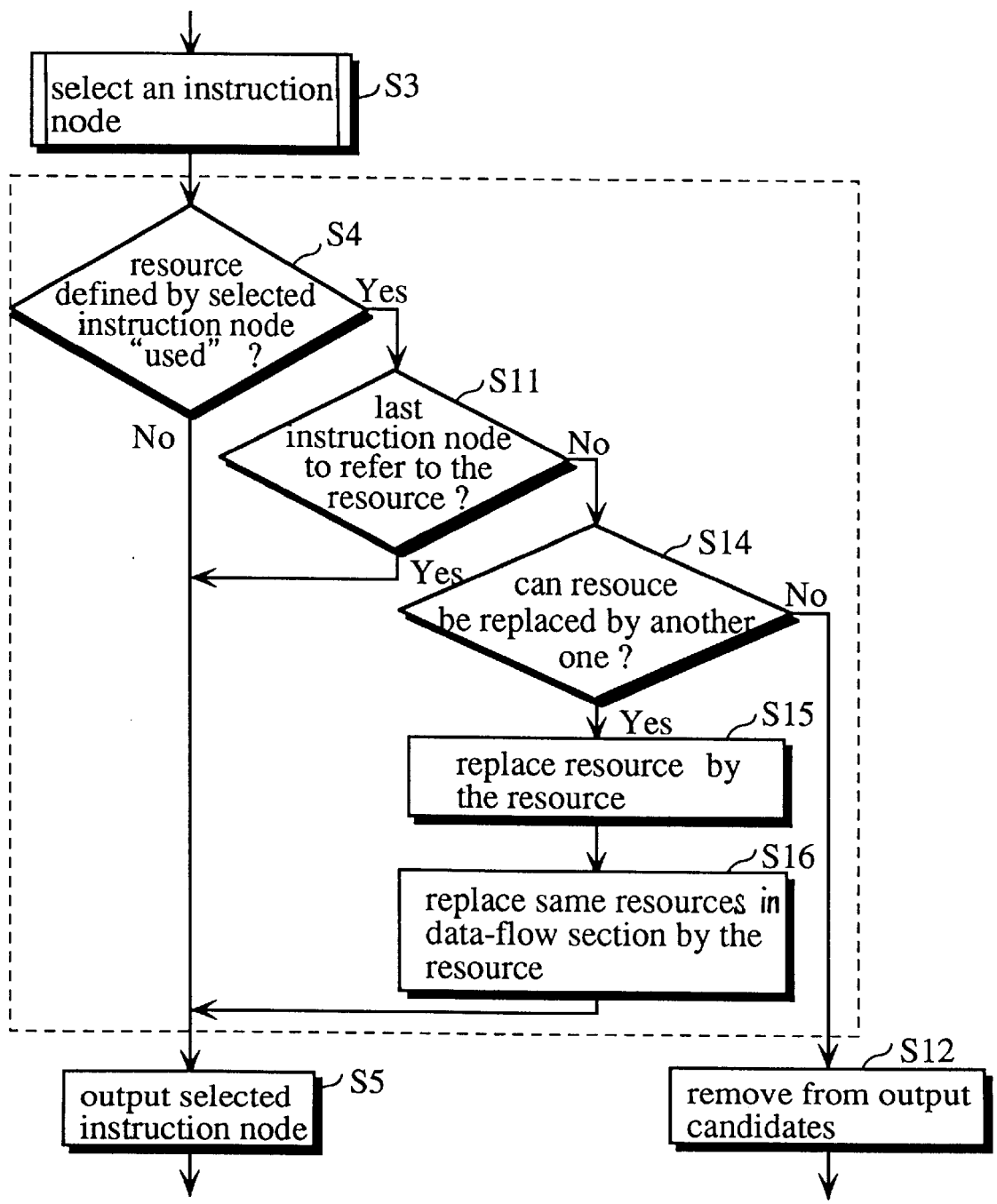
FIG. 15 shows steps added to the flowchart shown in FIG. 9 in Second Embodiment.

FIG. 15 shows steps S14, S15, and S16 are added to the flowchart of FIG. 9.

At step S14, it is judged whether a resource defined by an instruction node can be replaced by another resource. The resource is also called a replacement object resource. If can, the replacement object resource is replaced by another resource at step S15. Then, all the same replacement object resources in a data-flow section for the resource are replaced by the resource at step S16. As for the data-flow section, see (b) below.

At step S14, the following three conditions are checked for a "replacing resource" in the judgement:

(a) The state of the replacing resource is "not used" when the judgement is made.

(b) The replacing resource is not used in a data-flow section. The data-flow section ranges from the instruction node that defines the replacement object resource to a last instruction node that refers to the replacement object resource. Note that when the resource is defined again halfway, the section extends to the last reference of data of the redefined resource.

For example, in the following instruction sequence:

MOV memory2,D0 . . . (4)

ADD D0,D0 . . . (5)

MOV 1,D1 . . . (6)

ADD D1,D0 . . . (7)

MOV D0,D2 . . . (8), it will be appropriate for data register D0 defined by instruction "MOV memory2, D0" to be replaced by another data register, D1 or D2. However, data flows from register D1 to D0 in instruction (7), and from D0 to D2 in instruction (8). In such a case, that is, when data in a replacement object resource flows to a resource used in any of subsequent instruction nodes in the DAG, the resource should not be the "replacing resource."

(c) The replacement does not cause any error when the instruction is executed.

For example, suppose data register D1 and address register A1 are judged not to be used when address register A0 used in instruction "MOV (A0),D0" is to be replaced. Then, register D1 is selected as a candidate for the replacing register. However, it must be noted that "MOV (A0),D0" is an indirect reference instruction with a function to transfer data from a section of a memory specified by an address stored in address register A0 to data register D0. On the other hand, register D1 is a register for general purpose. Therefore, the processor cannot execute instruction "MOV (D1),D0."

As another example, suppose address register A0 is available when data register D0 used in instruction "MUL D1,D0" is to be replaced. However, it must be noted that "MUL D1,D0" is a multiplication instruction with a function to multiply a value of D1 by that of D0. On the other hand, register A0 stores data with a format for memory access. Therefore, the processor does not succeed in executing instruction "MUL A0,D0."

To avoid generating instructions the processor cannot execute, the following procedure is prepared:

First, types, e.g. data register, address register, memory, etc., of the resources selected by the above (a) and (b) are identified. Secondly, types of instructions which either define or refer to the resources and a type of the destructive instruction are identified. The types include indirect reference instruction, multiplication instruction, division instruction, etc.

Then, each combination of types of an instruction and a resource is compared with combination patterns stored in the processor, and resources in combinations that do not match the combination patterns are excluded from replacement-candidate resources.

In this way, the replacement-candidate resources are selected.

Now, it is described how the optimization apparatus of the Second Embodiment removes hazards with reference to figures.

Figures 16A, 16B:
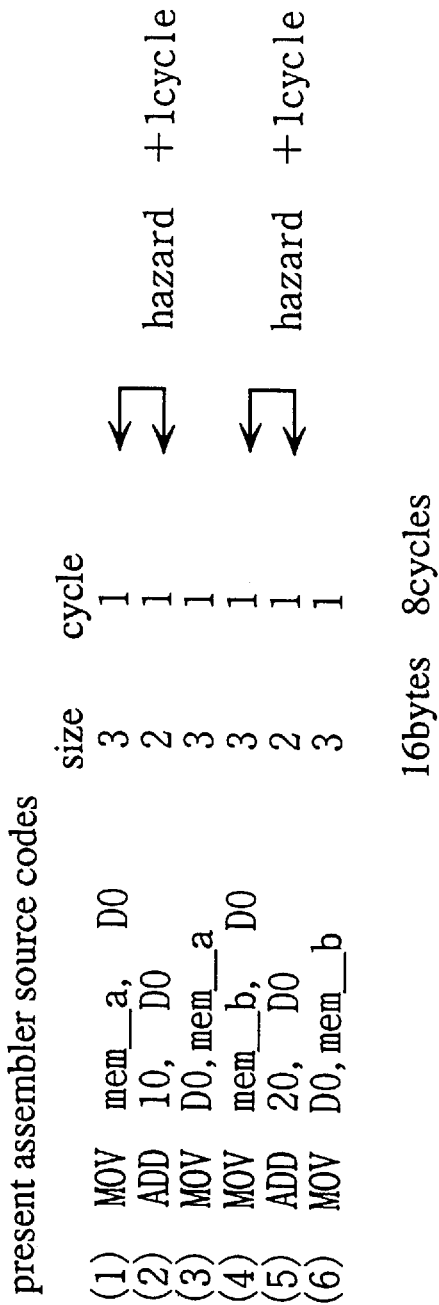
FIGS. 16A and 16B show a DAG whose instruction nodes cannot be rearranged since resource is always used.

FIGS. 16A and 16B show a DAG whose instruction nodes cannot be rearranged since a resource is always used.

In FIGS 16A and 16B, a hazard occurs between instructions 1 and 2 because register D0 defined by instruction 1 is referred to by instruction 2. Also, a hazard occurs between instructions 4 and 5 due to the same reason.

If a DAG is generated for the instruction sequence with definition-reference links, instructions 1, 2, and 3 and 4, 5, and 6 are linked. However, since register D0 is always used by the instructions in the basic block, inserting an instruction between instructions 1 and 2, or between instructions 4 and 5 is not possible.

Figure 17A:
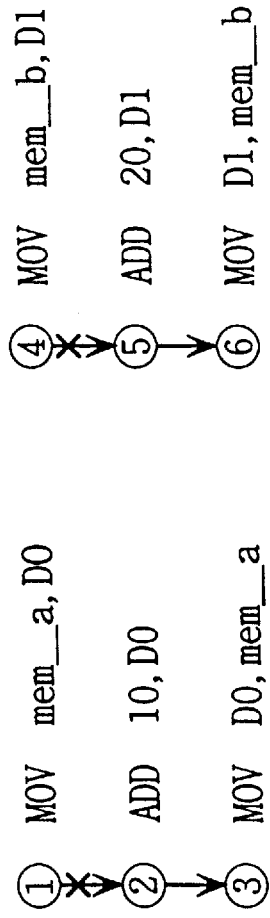
FIGS. 17A and 17B show replacements of resources defined by the instructions of the DAG as shown in FIGS. 16A and 16B.
Figure 17B:
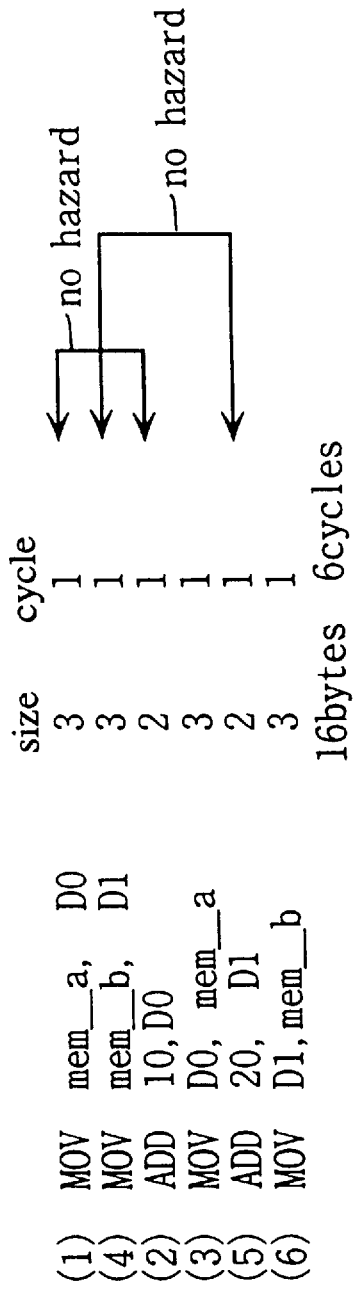

How the above instructions in the basic block are rearranged is described now. FIG. 17A and 17B show replacements of resources defined by the instructions of the DAG as shown in FIGS. 16A and 16B.

Suppose instruction node 1 has been output to output list buffer 17. Then, instruction node 4 is selected as an output candidate. Since register D0 is "used" according to the resource state information, and it is not the last reference, control moves to step S14. At step S14, it is judged whether the replacement object resource defined by instruction node 4 can be replaced by another resource. Since all the other resources are not used in the basic block, the above conditions (a) to (c) are satisfied. As a result, it is judged that is register D0 is replaceable. At step 15, register D0 is replaced by register D1. Then, instruction node 2 "MOV mem_b, D0" is replaced by instruction node "MOV mem_b,D1" at step S16. Similarly, at step S16, all the other register D0s used in the descendant instruction nodes are replaced by register D1s.

With such replacements, it is judged that all the resources defined by the selected instruction node are "not used" at step 4, and instructions are rearranged, succeeding in removing hazards.

As apparent from the above description, the optimzation apparatus of Second Embodiment outputs instruction nodes by replacing resources in the instruction nodes by other resources maintaining dependence between instructions. As a result, there is more room for rearranging instructions. This increases the rate of removing hazards in pipeline processing.

In these Embodiments, the optimization apparatus of the present invention deals with source programs written in an assembler language. However, the apparatus may be built in a compiler so that the apparatus operates on assembler programs with assembly codes output by the compiler.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optimization apparatus for removing hazards from a program by rearranging instructions for each program segment, wherein each program segment does not include any jump instruction nor any jump target label, comprising:

a Directed Acyclic Graph (hereinafter DAG) generating means for generating a plurality of DAGs for each program segment, each DAG showing a relationship between instructions by a parent-to-child relation wherein the parent instructions define resources and the child instructions refer to the resources;

a hazard marking means for marking hazard-including combinations of a parent instruction and a child instruction in the DAGs as a hazard;

a rearranging means for rearranging the instructions for each program segment so that instructions are inserted between the instructions of each marked combination, wherein the inserted instructions do not destroy values stored in resources used by the instructions of the marked combination;

a priority assigning means for assigning a higher priority to a top instruction of a DAG whose descendant instructions include a hazard, and assigning a lower priority to a top instruction of a DAG whose descendant instructions do not include a hazard, wherein descendant instructions of a top instruction are instructions in the DAG which are traced from the top instruction through parent-to-child relations directly or indirectly; and wherein the rearranging means comprises:
an extracting means for extracting a selected top instruction from the DAGs;
an instruction storage means for storing the extracted instructions serially in order of extraction;
a destructive instruction detecting means for detecting, as a destructive instruction, a top instruction of a DAG that destroys a value stored in a resource to be referred to later by another instruction in program segments;
a marked instruction detecting means for detecting a top instruction of a DAG whose parent instruction is a last instruction in the instruction storage means, and which makes up a marked combination with the parent instruction;
an extraction prohibiting means for prohibiting the extracting means from extracting the destructive instruction and the instruction detected by the marked instruction detecting means; and
an instruction selecting means for selecting a top instruction of a DAG which has the highest priority and which is not prohibited by the extraction prohibiting means, wherein the extracting means extracts the selected top instruction, and the rearranging means repeats operations of the extracting means through the instruction selecting means until a last instruction of a program segment is extracted, and wherein the optimization apparatus obtains rearranged instructions for the program segment from the instruction storage means.

2. The optimization apparatus of claim 1 further comprises:
a resource flag storage means for storing resource flags which correspond to resources, wherein a resource flag is set to "ON" when the corresponding resource is used in a program segment, and is set to "OFF" when the corresponding resource is not used, wherein an initial state of resource flags of the program segment reflects a final state of those of a preceding program segment; and
an updating means for updating the resource flags each time an instruction is stored in the instruction storage means by setting a resource flag to "ON" when a corresponding resource is defined by the instruction and is referred to later by another instruction, and by setting a resource flag to "OFF" when a corresponding resource is referred to by the instruction as a last reference, wherein the destructive instruction detecting means refers to "ON" resource flags and judges whether a value stored in any of corresponding resources is destroyed by a top instruction.

3. The optimization apparatus of claim 2, wherein a parent instruction has a plurality of child instructions when a resource defined by the parent instruction is referred to by the plurality of child instructions in a program segment, and a child instruction has a plurality of parent instructions in a program segment when a plurality of resources defined by the plurality of parent instructions are referred to and defined again by a child instruction, and wherein the updating means further comprises:
a reference judging unit for judging whether resources defined by the instructions extracted by the extracting means are referred to by other instructions later in the program segment;
a first updating unit for setting resource flags corresponding to the resources judged by the reference judging unit to be referred to to "ON";
a first parent instruction detecting unit for detecting all parent instructions of an instruction extracted by the extracting means;
a first child instruction detecting unit for detecting all child instructions of the parent instructions detected by the first parent instruction detecting unit;
a first extraction judging unit for judging whether all of the child instructions detected by the first child instruction detecting unit, excluding the instruction extracted by the extracting means, have been extracted;
a second updating unit for setting resource flags corresponding to the resources referred to by the extracted instructions to "OFF" when no child instruction other than the extracted instructions is detected, or when the first extraction judging unit judges that all of the child instructions have been extracted.

4. The optimization apparatus of claim 3, wherein the destructive instruction detecting means further comprises:
a candidate nominating unit for nominating a top instruction of a DAG in a program segment as a destructive-instruction candidate;
a resource flag checking unit for checking to see if all resource flags corresponding to resources defined by the destructive-instruction candidate are set to "OFF";
a first removing unit for removing the top instruction from the destructive-instruction candidate if the resource flag checking unit confirms that all the resource flags are set to "OFF";
a second parent instruction detecting unit for detecting all parent instructions of the destructive-instruction candidate if the resource flag checking unit confirms that at least one resource flag is set to "ON";
a second child instruction detecting unit for detecting all child instructions of the parent instructions detected by the second parent instruction detecting unit for each of the parent instructions;
a second extraction judging unit for judging whether all of the child instructions detected by the second child instruction detecting unit, excluding the destructive-instruction candidate, have been extracted;
a second removing unit for removing the top instruction from the destructive-instruction candidate when no child instruction other than the candidates is detected, or when the second extraction judging unit judges that all of the child instructions have been extracted; and
an outputting unit for outputting the top instruction which has not been removed from the destructive-instruction candidate as the destructive-instruction to the extraction prohibiting means.

5. The optimization apparatus of claim 4, wherein the rearranging means further comprises:
a first restoring means for restoring the DAGs before an extraction of a last instruction in the instruction storage means if the destructive instruction detecting means detects all the top instructions of DAGs of the program segment as destructive instructions; and a second restoring means for causing resource flags corresponding to resources whose values have been changed by the last instruction to return to a state before the extraction of the last instruction; and wherein after the last instruction is returned to a DAG, the instruction selecting means selects an instruction with a priority next to that of the returned instruction.

6. The optimization apparatus of claim 2, wherein a parent instruction has a plurality of child instructions when a resource defined by the parent instruction is referred to by the plurality of child instructions in a program segment, and a child instruction has a plurality of parent instructions in a program segment when a plurality of resources defined by the plurality of parent instructions are referred to and defined again by a child instruction, and wherein the destructive instruction detecting means further comprises:

a candidate nominating unit for nominating a top instruction of a DAG in a program segment as a destructive-instruction candidate;

a resource flag checking unit for checking to see if all resource flags corresponding to resources defined by the destructive-instruction candidate are set to "OFF";

a first removing unit for removing the top instruction from the destructive-instruction candidate if the resource flag checking unit confirms that all the resource flags are set to "OFF";

a second parent instruction detecting unit for detecting all parent instructions of the destructive-instruction candidate if the resource flag checking unit confirms that at least one resource flag is set to s are set to "ON";

a second child instruction detecting unit for detecting all child instructions of the parent instructions detected by the second parent instruction detecting unit for each of the parent instructions;

a second extraction judging unit for judging whether all of the child instructions detected by the second child instruction detecting unit, excluding the destructive-instruction candidate, have been extracted;

a second removing unit for removing the top instruction from the destructive-instruction candidate when no child instruction other than the candidates is detected, or when the second extraction judging unit judges that all of the child instructions have been extracted; and an outputting unit for outputting the top instruction which has not been removed from the destructive-instruction candidate as the destructive-instruction to the extraction prohibiting means.

7. The optimization apparatus of claim 6, wherein the rearranging means further comprises:

a first restoring means for restoring the DAGs before an extraction of a last instruction in the instruction storage means if the destructive instruction detecting means detects all the top instructions of DAGs of the program segment as destructive instructions; and a second restoring means for causing resource flags corresponding to resources whose values have been changed by the last instruction to return to a state before the extraction of the last instruction; and wherein after the last instruction is returned to a DAG, the instruction selecting means selects an instruction with a priority next to that of the returned instruction.

8. An optimization apparatus for removing hazards from a program by rearranging instructions for each program segment, wherein each program segment does not include any jump instruction nor any jump target label, comprising:

a Directed Acyclic Graph (hereinafter DAG) generating means for generating a plurality of DAGs for each program segment, each DAG showing a relationship between instructions by a parent-to-child relation wherein the parent instructions define resources and the child instructions refer to the resources;

a hazard marking means for marking hazard-including combinations of a parent instruction and a child instruction in the DAGs as a hazard;

a rearranging means for rearranging the instructions for each program segment so that instructions are inserted between the instructions of each marked combination, wherein the inserted instructions do not destroy values stored in resources used by the instructions of the marked combination;

a first priority assigning means for assigning a first priority to a top instruction of a DAG whose descendant instructions include a hazard, and assigning a second priority to a top instruction of a DAG whose descendant instructions do not include a hazard, wherein the first priority is higher than the second priority, and wherein descendant instructions of a top instruction are instructions in the DAG which are traced from the top instruction through parent-to-child relations directly or indirectly; and wherein the rearranging means comprises:

an extracting means for extracting a selected top instruction from the DAGs;

an instruction storage means for storing the extracted instructions serially in order of extraction;

a destructive instruction detecting means for detecting, as a destructive instruction, a top instruction of a DAG that destroys a value stored in a resource to be referred to later by other instructions in program segments;

a marked instruction detecting means for detecting a top instruction of a DAG whose parent instruction is a last instruction in the instruction storage means, and which makes up a marked combination with the parent instruction;

a second priority assigning means for assigning a third priority to the instruction detected by the marked instruction detecting means, wherein the third priority is lower than the second priority;

an extraction prohibiting means for prohibiting the extracting means from extracting the destructive instruction; and an instruction selecting means for selecting a top instruction of a DAG which has highest priority and which is not an instruction prohibited by the extraction prohibiting means from being extracted by the extracting means, wherein the extracting means extracts the selected top instruction, and the rearranging means repeats operations of the extracting means through the instruction selecting means until a last instruction of a program segment is extracted, and wherein the optimization apparatus obtains rearranged instructions for the program segment from the instruction storage means.

9. The optimization apparatus of claim 8 further comprises:

a resource flag storage means for storing resource flags which correspond to resources, wherein a resource flag is set to "ON" when the corresponding resource is used in a program segment, and is set to "OFF" when the corresponding resource is not used, wherein an initial state of resource flags of the program segment reflects a final state of those of a preceding program segment; and an updating means for updating the resource flags each time an instruction is stored in the instruction storage means by setting a resource flag to "ON" when a corresponding resource is defined by the instruction and is referred to later by another instruction, and by setting a resource flag to "OFF" when a corresponding resource is referred to by the instruction as a last reference, wherein the destructive instruction detecting means refers to "ON" resource flags and judges whether a value stored in any of corresponding resources is destroyed by a top instruction.

10. The optimization apparatus of claim 9, wherein a parent instruction has a plurality of child instructions when a resource defined by the parent instruction is referred to by the plurality of child instructions in a program segment, and a child instruction has a plurality of parent instructions in a program segment when a plurality of resources defined by the plurality of parent instructions are referred to and defined again by a child instruction, and wherein the updating means further comprises:
a reference judging unit for judging whether resources defined by the instructions extracted by the extracting means are referred to by other instructions later in the program segment;
a first updating unit for setting resource flags corresponding to the resources judged by the reference judging unit to be referred to to "ON";
a first parent instruction detecting unit for detecting all parent instructions of an instruction extracted by the extracting means;
a first child instruction detecting unit for detecting all child instructions of the parent instructions detected by the first parent instruction detecting unit;
a first extraction judging unit for judging whether all of the child instructions detected by the first child instruction detecting unit, excluding the instruction extracted by the extracting means, have been extracted;
a second updating unit for setting resource flags corresponding to the resources referred to by the extracted instructions to "OFF" when no child instruction other than the extracted instructions is detected, or when the first extraction judging unit judges that all of the child instructions have been extracted.

11. The optimization apparatus of claim 10, wherein the destructive instruction detecting means further comprises:
a candidate nominating unit for nominating a top instruction of a DAG in a program segment as a destructive-instruction candidate;
a resource flag checking unit for checking to see if all resource flags corresponding to resources defined by the destructive-instruction candidate are set to "OFF";
a first removing unit for removing the top instruction from the destructive-instruction candidate if the resource flag checking unit confirms that all the resource flags are set to "OFF";
a second parent instruction detecting unit for detecting all parent instructions of the destructive-instruction candidate if the resource flag checking unit confirms that at least one resource flag is set to s are set to "ON";

a second child instruction detecting unit for detecting all child instructions of the parent instructions detected by the second parent instruction detecting unit for each of the parent instructions;
a second extraction judging unit for judging whether all of the child instructions detected by the second child instruction detecting unit, excluding the destructive-instruction candidate, have been extracted;
a second removing unit for removing the top instruction from the destructive-instruction candidate when no child instruction other than the candidates is detected, or when the second extraction judging unit judges that all of the child instructions have been extracted; and
an outputting unit for outputting the top instruction which has not been removed from the destructive-instruction candidate as the destructive-instruction to the extraction prohibiting means.

12. The optimization apparatus of claim 11, wherein the rearranging means further comprises:
a first restoring means for restoring the DAGs before an extraction of a last instruction in the instruction storage means if the destructive instruction detecting means detects all the top instructions of DAGs of the program segment as destructive instructions; and
a second restoring means for causing resource flags corresponding to resources whose values have been changed by the last instruction to return to a state before the extraction of the last instruction; and
wherein after the last instruction is returned to a DAG, the instruction selecting means selects an instruction with a priority next to that of the returned instruction.

13. An optimization apparatus for removing hazards from a program by rearranging instructions for each program segment, wherein each program segment does not include any jump instructions nor any jump target label, comprising:
a Directed Acyclic Graph (hereinafter DAG) generating means for generating a plurality of DAGs for each program segment, each DAG showing a relationship between instructions by a parent-to-child relation wherein the parent instructions define resources and the child instructions refer to the resources;
a hazard marking means for marking hazard-including combinations of a parent instruction and a child instruction in the DAGs as a hazard;
a rearranging means for rearranging the instructions for each program segment so that instructions are inserted between the instructions of each marked combination, wherein the inserted instructions do not destroy values stored in resources used by the instructions of the marked combination; and
a priority assigning means for assigning a higher priority to a top instruction of a DAG whose descendant instructions include a hazard, and assigning a lower priority to a top instruction of a DAG whose descendant instructions do not include a hazard, wherein descendant instructions of a top instruction are instructions in the DAG which are traced from the top instruction through parent-to-child relations directly or indirectly; and
wherein the rearranging means comprises:
an extracting means for extracting a selected top instruction from the DAGs;
an instruction storage means for storing the extracted instructions serially in order of extraction;
a destructive instruction detecting means for detecting, as a destructive instruction, a top instruction of a DAG that destroys a value stored in a resource to be referred to later by another instruction in program segments;

a marked instruction detecting means for detecting a top instruction of a DAG whose parent instruction is a last instruction in the instruction storage means, and which makes up a marked combination with the parent instruction;

an extraction prohibiting means for prohibiting the extracting means from extracting the destructive instruction and the instruction detected by the marked instruction detecting means; and an instruction selecting means for selecting a top instruction of a DAG which has highest priority and which is not prohibited by the extraction prohibiting means, wherein the extracting means extracts the selected top instruction, and the rearranging means repeats operations of the extracting means through the instruction selecting means until a last instruction of a program segment is extracted, and wherein the optimization apparatus obtains rearranged instructions for the program segment from the instruction storage means.

14. The optimization apparatus of claim 13 further comprises:

a resource flag storage means for storing resource flags which correspond to resources, wherein a resource flag is set to "ON" when the corresponding resource is used in a program segment, and is set to "OFF" when the corresponding resource is not used, wherein an initial state of resource flags of the program segment reflects a final state of those of a preceding program segment; and an updating means for updating the resource flags each time an instruction is stored in the instruction storage means by setting a resource flag to "ON" when a corresponding resource is defined by the instruction and is referred to later by another instruction, and by setting a resource flag to "OFF" when a corresponding resource is referred to by the instruction as a last reference, wherein the destructive instruction detecting means refers to "ON" resource flags and judges whether a value stored in any of corresponding resources is destroyed by a top instruction.

15. The optimization apparatus of claim 14, wherein a parent instruction has a plurality of child instructions when a resource defined by the parent instruction is referred to by the plurality of child instructions in a program segment, and a child instruction has a plurality of parent instructions in a program segment when a plurality of resources defined by the plurality of parent instructions are referred to and defined again by a child instruction, and wherein the updating means further comprises:

a reference judging unit for judging whether resources defined by the instructions extracted by the extracting means are referred to by other instructions later in the program segment;

a first updating unit for setting resource flags corresponding to the resources judged by the reference judging unit to be referred to to "ON";

a first parent instruction detecting unit for detecting all parent instructions of an instruction extracted by the extracting means;

a first child instruction detecting unit for detecting all child instructions of the parent instructions detected by the first parent instruction detecting unit;

a first extraction judging unit for judging whether all of the child instructions detected by the first child instruction detecting unit, excluding the instruction extracted by the extracting means, have been extracted;

a second updating unit for setting resource flags corresponding to the resources referred to by the extracted instructions to "OFF" when no child instruction other than the extracted instructions is detected, or when the first extraction judging unit judges that all of the child instructions have been extracted.

16. The optimization apparatus of claim 15, wherein the destructive instruction detecting means further comprises:

a candidate nominating unit for nominating a top instruction of a DAG in a program segment as a destructive-instruction candidate;

a resource flag checking unit for checking to see if all resource flags corresponding to resources defined by the destructive-instruction candidate are set to "OFF";

a first removing unit for removing the top instruction from the destructive-instruction candidate if the resource flag checking unit confirms that all the resource flags are set to "OFF";

a second parent instruction detecting unit for detecting all parent instructions of the destructive-instruction candidate if the resource flag checking unit confirms that at least one resource flag is set to s are set to "ON";

a second child instruction detecting unit for detecting all child instructions of the parent instructions detected by the second parent instruction detecting unit for each of the parent instructions;

a second extraction judging unit for judging whether all of the child instructions detected by the second child instruction detecting unit, excluding the destructive-instruction candidate, have been extracted;

a second removing unit for removing the top instruction from the destructive-instruction candidate when no child instruction other than the candidates is detected, or when the second extraction judging unit judges that all of the child instructions have been extracted; and an outputting unit for outputting the top instruction which has not been removed from the destructive-instruction candidate as the destructive-instruction to the extraction prohibiting means.

17. The optimization apparatus of claim 16, wherein the rearranging means further comprises:

a first restoring means for restoring the DAGs before an extraction of a last instruction in the instruction storage means if the destructive instruction detecting means detects all the top instructions of DAGs of the program segment as destructive instructions; and a second restoring means for causing resource flags corresponding to resources whose values have been changed by the last instruction to return to a state before the extraction of the last instruction; and wherein after the last instruction is returned to a DAG, the instruction selecting means selects an instruction with a priority next to that of the returned instruction.

18. An optimization apparatus for removing hazards from a program by rearranging instructions for each program segment, wherein each program segment does not include any jump instruction nor any jump target label, comprising:

a Directed Acyclic Graph (hereinafter DAG) generating means for generating a plurality of DAGs for each program segment, each DAG showing a relationship between instructions by parent-to-child relation wherein the parent instructions define resources and the child instructions refer to the resources;

a hazard marking means for marking hazard-including combinations of a parent instruction and a child instruction in the DAGs as a hazard;

a rearranging means for rearranging the instructions for each program segment so that instructions are inserted between the instructions of each marked combination, wherein the inserted instructions do not destroy values stored in resources used by the instructions of the marked combination; and a priority assigning means for assigning a higher priority to a top instruction of a DAG whose descendant instructions, include a hazard, and assigning a lower priority to a top instruction of a DAG whose descendant instructions do not include a hazard, wherein descendant instructions of a top instruction are instructions in the DAG which are traced from the top instruction through parent-to-child relations directly or indirectly; and wherein the rearranging means comprises:

an extracting means for extracting a selected top instruction from the DAGs;

an instruction storage means for storing the extracted instructions serially in order of extraction;

a destructive instruction detecting means for detecting, as a destructive instruction, a top instruction of a DAG that destroys a value stored in a resource to be referred to later by another instruction in program segments;

a marked instruction detecting means for detecting a top instruction of a DAG whose parent instruction is a last instruction in the instruction storage means, and which makes up a marked combination with the parent instruction;

a first resource selecting means for selecting resources which are not used in a data-flow section if the destructive instruction detecting means detects a destructive instruction, wherein the data-flow section ranges from the destructive instruction to a last instruction in the DAG that refers to the resource whose value is destroyed by the destructive instruction, wherein when the resource is defined again halfway, the data-flow section extends to a last reference of data of the re-defined resource;

a first identifying means for identifying types of the resources selected by the first resource selecting means;

a second identifying means for identifying types of instructions which either define or refer to the resources and a type of the destructive instruction;

a second resource selecting means for selecting replacement-candidate resources from the resources selected by the first resource selecting means by making each combination of types of an instruction and a resource, comparing the combination with combination patterns stored in a processor, and excluding resources in combinations that do not match the combination patterns;

a resource replacing means for replacing a resource defined by the destructive instruction by any of the replacement-candidate resources for each instruction with the resource in the data-flow section;

an extraction prohibiting means for prohibiting the extracting means from extracting the instruction detected by the marked instruction detecting means and the destructive instruction whose resources have not been replaced by other resources by the resource replacing means; and an instruction selecting means for selecting a top instruction of a DAG which has highest priority and which is not prohibited by the extraction prohibiting means, wherein the extracting means extracts the selected top instruction, and the rearranging means repeats operations of the extracting means through the instruction selecting means until a last instruction of a program segment is extracted, and wherein the optimization apparatus obtains rearranged instructions for the program segment from the instruction storage means.

19. The optimization apparatus of claim 18 further comprises:

a resource flag storage means for storing resource flags which correspond to resources, wherein a resource flag is set to "ON" when the corresponding resource is used in a program segment, and is set to "OFF" when the corresponding resource is not used, wherein an initial state of resource flags of the program segment reflects a final state of those of a preceding program segment; and an updating means for updating the resource flags each time an instruction is stored in the instruction storage means by setting a resource flag to "ON" when a corresponding resource is defined by the instruction and is referred to later by another instruction, and by setting a resource flag to "OFF" when a corresponding resource is referred to by the instruction as a last reference, wherein the destructive instruction detecting means refers to "ON" resource flags and judges whether a value stored in any of corresponding resources is destroyed by a top instruction.

20. The optimization apparatus of claim 19, wherein a parent instruction has a plurality of child instructions when a resource defined by the parent instruction is referred to by the plurality of child instructions in a program segment, and a child instruction has a plurality of parent instructions in a program segment when a plurality of resources defined by the plurality of parent instructions are referred to and defined again by a child instruction, and wherein the updating means further comprises:

a reference judging unit for judging whether resources defined by the instructions extracted by the extracting means are referred to by other instructions later in the program segment;

a first updating unit for setting resource flags corresponding to the resources judged by the reference judging unit to be referred to to "ON";

a first parent instruction detecting unit for detecting all parent instructions of an instruction extracted by the extracting means;

a first child instruction detecting unit for detecting all child instructions of the parent instructions detected by the first parent instruction detecting unit;

a first extraction judging unit for judging whether all of the child instructions detected by the first child instruction detecting unit, excluding the instruction extracted by the extracting means, have been extracted;

a second updating unit for setting resource flags corresponding to the resources referred to by the extracted instructions to "OFF" when no child instruction other than the extracted instructions is detected, or when the first extraction judging unit judges that all of the child instructions have been extracted.

21. The optimization apparatus of claim 20, wherein the destructive instruction detecting means further comprises:
- a candidate nominating unit for nominating a top instruction of a DAG in a program segment as a destructive-instruction candidate;
- a resource flag checking unit for checking to see if all resource flags corresponding to resources defined by the destructive-instruction candidate are set to "OFF";
- a first removing unit for removing the top instruction from the destructive-instruction candidate if the resource flag checking unit confirms that all the resource flags are set to "OFF";
- a second parent instruction detecting unit for detecting all parent instructions of the destructive-instruction candidate if the resource flag checking unit confirms that at least one resource flag is set to s are set to "ON";
- a second child instruction detecting unit for detecting all child instructions of the parent instructions detected by the second parent instruction detecting unit for each of the parent instructions;
- a second extraction judging unit for judging whether all of the child instructions detected by the second child instruction detecting unit, excluding the destructive-instruction candidate, have been extracted;
- a second removing unit for removing the top instruction from the destructive-instruction candidate when no child instruction other than the candidates is detected, or when the second extraction judging unit judges that all of the child instructions have been extracted; and
- an outputting unit for outputting the top instruction which has not been removed from the destructive-instruction candidate as the destructive-instruction to the extraction prohibiting means.

22. The optimization apparatus of claim 21, wherein the rearranging means further comprises:
- a first restoring means for restoring the DAGs before an extraction of a last instruction in the instruction storage means if the destructive instruction detecting means detects all the top instructions of DAGs of the program segment as destructive instructions; and
- a second restoring means for causing resource flags corresponding to resources whose values have been changed by the last instruction to return to a state before the extraction of the last instruction; and
- wherein after the last instruction is returned to a DAG, the instruction selecting means selects an instruction with a priority next to that of the returned instruction.

23. An optimization apparatus for removing hazards from a program by rearranging instructions for each program segment, wherein each program segment does not include any jump instruction nor any jump target label, comprising:
- a Directed Acyclic Graph (hereinafter DAG) generating means for generating a plurality of DAGs for each program segment, each DAG showing a relationship between instructions by a parent-to-child relation wherein the parent instructions define resources and the child instructions refer to the resources;
- a hazard marking means for marking hazard-including combinations of a parent instruction and a child instruction in the DAGs as a hazard;
- a rearranging means for rearranging the instructions for each program segment so that instructions are inserted between the instructions of each marked combination, wherein the inserted instructions do not destroy values stored in resources used by the instructions of the marked combination; and
- a priority assigning means for assigning a higher priority to a top instruction of a DAG whose descendant instructions include a hazard, and assigning a lower priority to a top instruction of a DAG whose descendant instructions do not include a hazard, wherein descendant instructions of a top instruction are instructions in the DAG which are traced from the top instruction through parent-to-child relations directly or indirectly; and
- wherein the rearranging means comprises:
  - an extracting means for extracting a selected top instruction from the DAGs;
  - an instruction storage means for storing the extracted instructions serially in order of extraction;
  - a destructive instruction detecting means for detecting, as a destructive instruction, a top instruction of a DAG that destroys a value stored in a resource to be referred to later by another instruction in program segments;
  - a marked instruction detecting means for detecting a top instruction of a DAG whose parent instruction is a last instruction in the instruction storage means, and which makes up a marked combination with the parent instruction;
  - a first resource selecting means for, if the destructive instruction detecting means detects a destructive instruction, selecting resources which are not used in a DAG whose top instruction is the destructive instruction;
  - a first identifying means for identifying types of the resources selected by the first resource selecting means;
  - a second identifying means for identifying types of instructions which either define or refer to the resources and a type of the destructive instruction;
  - a second resource selecting means for selecting replacement-candidate resources from the resources selected by the first resource selecting means by making each combination of types of an instruction and a resource, comparing the combination with combination patterns stored in a processor, and excluding resources in combinations that do not match the combination patterns;
  - a resource replacing means for replacing a resource defined by the destructive instruction by any of the replacement-candidate resources for each instruction with the resource in the data-flow section;
  - an extraction prohibiting means for prohibiting the extracting means from extracting the instruction detected by the marked instruction detecting means and the destructive instruction whose resources have not been replaced by other resources by the resource replacing means; and
  - an instruction selecting means for selecting a top instruction of a DAG which has highest priority and which is not prohibited by the extraction prohibiting means, wherein the extracting means extracts the selected top instruction, and the rearranging means repeats operations of the extracting means through the instruction selecting means until a last instruction of a program segment is extracted, and wherein the optimization apparatus obtains rearranged instructions for the program segment from the instruction storage means.

24. The optimization apparatus of claim 23 further comprises:
- a resource flag storage means for storing resource flags which correspond to resources, wherein a resource flag is set to "ON" when the corresponding resource is used in a program segment, and is set to "OFF" when the corresponding resource is not used, wherein an initial state of resource flags of the program segment reflects a final state of those of a preceding program segment; and an updating means for updating the resource flags each time an instruction is stored in the instruction storage means by setting a resource flag to "ON" when a corresponding resource is defined by the instruction and is referred to later by another instruction, and by setting a resource flag to "OFF" when a corresponding resource is referred to by the instruction as a last reference, wherein the destructive instruction detecting means refers to "ON" resource flags and judges whether a value stored in any of corresponding resources is destroyed by a top instruction.

25. The optimization apparatus of claim 24, wherein a parent instruction has a plurality of child instructions when a resource defined by the parent instruction is referred to by the plurality of child instructions in a program segment, and a child instruction has a plurality of parent instructions in a program segment when a plurality of resources defined by the plurality of parent instructions are referred to and defined again by a child instruction, and wherein the updating means further comprises:

a reference judging unit for judging whether resources defined by the instructions extracted by the extracting means are referred to by other instructions later in the program segment;

a first updating unit for setting resource flags corresponding to the resources judged by the reference judging unit to be referred to to "ON";

a first parent instruction detecting unit for detecting all parent instructions of an instruction extracted by the extracting means;

a first child instruction detecting unit for detecting all child instructions of the parent instructions detected by the first parent instruction detecting unit;

a first extraction judging unit for judging whether all of the child instructions detected by the first child instruction detecting unit, excluding the instruction extracted by the extracting means, have been extracted;

a second updating unit for setting resource flags corresponding to the resources referred to by the extracted instructions to "OFF" when no child instruction other than the extracted instructions is detected, or when the first extraction judging unit judges that all of the child instructions have been extracted.

26. The optimization apparatus of claim 25, wherein the destructive instruction detecting means further comprises:

a candidate nominating unit for nominating a top instruction of a DAG in a program segment as a destructive-instruction candidate;

a resource flag checking unit for checking to see if all resource flags corresponding to resources defined by the destructive-instruction candidate are set to "OFF";

a first removing unit for removing the top instruction from the destructive-instruction candidate if the resource flag checking unit confirms that all the resource flags are set to "OFF";

a second parent instruction detecting unit for detecting all parent instructions of the destructive-instruction candidate if the resource flag checking unit confirms that at least one resource flag is set to s are set to "ON";

a second child instruction detecting unit for detecting all child instructions of the parent instructions detected by the second parent instruction detecting unit for each of the parent instructions;

a second extraction judging unit for judging whether all of the child instructions detected by the second child instruction detecting unit, excluding the destructive-instruction candidate, have been extracted;

a second removing unit for removing the top instruction from the destructive-instruction candidate when no child instruction other than the candidates is detected, or when the second extraction judging unit judges that all of the child instructions have been extracted; and an outputting unit for outputting the top instruction which has not been removed from the destructive-instruction candidate as the destructive-instruction to the extraction prohibiting means.

27. The optimization apparatus of claim 26, wherein the rearranging means further comprises:

a first restoring means for restoring the DAGs before an extraction of a last instruction in the instruction storage means if the destructive instruction detecting means detects all the top instructions of DAGs of the program segment as destructive instructions; and a second restoring means for causing resource flags corresponding to resources whose values have been changed by the last instruction to return to a state before the extraction of the last instruction; and wherein after the last instruction is returned to a DAG, the instruction selecting means selects an instruction with a priority next to that of the returned instruction.

28. An optimization apparatus for removing delays in pipeline processing by rearranging instructions for each program segment, wherein the delays occur since a resource defined by a load instruction is referred to by any of an Arithmetic Logic Unit (hereinafter ALU) operation and an address operation both of which succeed to the load instruction, and wherein each program segment does not include any jump instruction nor any jump target label, comprising:

a Directed Acyclic Graph (hereinafter DAG) generating means for generating a plurality of DAGs for each program segment, each DAG showing a relationship between instructions by a parent-to-child relation wherein the parent instructions define resources and the child instructions refer to the resources;

a hazard marking means for marking an instruction sequence in which a resource defined by a load instruction is referred to by any of an ALU operation and an address operation both of which succeed to the load instruction;

a rearranging means for rearranging the instructions for each program segment so that instructions are inserted between the instructions of each marked instruction sequence, wherein the inserted instructions do not destroy values stored in resources used by the instructions of the marked instruction sequence;

a priority assigning means for assigning a higher priority to a top instruction of each DAG whose descendant instructions include a hazard, and assigning a lower priority to a top instruction of each DAG whose descendant instructions do not include a hazard, wherein descendant instructions of a top instruction are instructions in the DAG which are traced from the top instruction through parent-to-child relations directly or indirectly; and wherein the rearranging means comprises:
   an extracting means for extracting a selected top instruction from the DAGs;
   an instruction storage means for storing the extracted instructions serially in order of extraction;
   a destructive instruction detecting means for detecting, as a destructive instruction, a top instruction of a DAG that destroys a value stored in a resource to be referred to later by another instruction in program segments;
   a marked instruction detecting means for detecting a top instruction of a DAG whose parent instruction is a last instruction in the instruction storage means, and which makes up a marked combination with the parent instruction;
   an extraction prohibiting means for prohibiting the extracting means from extracting the destructive instruction and the instruction detected by the marked instruction detecting means; and
   an instruction selecting means for selecting a top instruction of a DAG which has highest priority and which is not prohibited by the extraction prohibiting means, wherein the extracting means extracts the selected top instruction, and the rearranging means repeats operations of the extracting means through the instruction selecting means until a last instruction of a program segment is extracted, and wherein the optimization apparatus obtains rearranged instructions for the program segment from the instruction storage means.

29. The optimization apparatus of claim 28 further comprises:
   a resource flag storage means for storing resource flags which correspond to resources, wherein a resource flag is set to "ON" when the corresponding resource is used in a program segment, and is set to "OFF" when the corresponding resource is not used, wherein an initial state of resource flags of the program segment reflects a final state of those of a preceding program segment; and
   an updating means for updating the resource flags each time an instruction is stored in the instruction storage means by setting a resource flag to "ON" when a corresponding resource is defined by the instruction and is referred to later by another instruction, and by setting a resource flag to "OFF" when a corresponding resource is referred to by the instruction as a last reference, wherein the destructive instruction detecting means refers to "ON" resource flags and judges whether a value stored in any of corresponding resources is destroyed by a top instruction.

30. The optimization apparatus of claim 29, wherein a parent instruction has a plurality of child instructions when a resource defined by the parent instruction is referred to by the plurality of child instructions in a program segment, and a child instruction has a plurality of parent instructions in a program segment when a plurality of resources defined by the plurality of parent instructions are referred to and defined again by a child instruction, and
   wherein the updating means further comprises:
      a reference judging unit for judging whether resources defined by the instructions extracted by the extracting means are referred to by other instructions later in the program segment;
      a first updating unit for setting resource flags corresponding to the resources judged by the reference judging unit to be referred to to "ON";
      a first parent instruction detecting unit for detecting all parent instructions of an instruction extracted by the extracting means;
      a first child instruction detecting unit for detecting all child instructions of the parent instructions detected by the first parent instruction detecting unit;
      a first extraction judging unit for judging whether all of the child instructions detected by the first child instruction detecting unit, excluding the instruction extracted by the extracting means, have been extracted;
      a second updating unit for setting resource flags corresponding to the resources referred to by the extracted instructions to "OFF" when no child instruction other than the extracted instructions is detected, or when the first extraction judging unit judges that all of the child instructions have been extracted.

31. The optimization apparatus of claim 30, wherein the destructive instruction detecting means further comprises:
   a candidate nominating unit for nominating a top instruction of a DAG in a program segment as a destructive-instruction candidate;
   a resource flag checking unit for checking to see if all resource flags corresponding to resources defined by the destructive-instruction candidate are set to "OFF";
   a first removing unit for removing the top instruction from the destructive-instruction candidate if the resource flag checking unit confirms that all the resource flags are set to "OFF";
   a second parent instruction detecting unit for detecting all parent instructions of the destructive-instruction candidate if the resource flag checking unit confirms that at least one resource flag is set to s are set to "ON";
   a second child instruction detecting unit for detecting all child instructions of the parent instructions detected by the second parent instruction detecting unit for each of the parent instructions;
   a second extraction judging unit for judging whether all of the child instructions detected by the second child instruction detecting unit, excluding the destructive-instruction candidate, have been extracted;
   a second removing unit for removing the top instruction from the destructive-instruction candidate when no child instruction other than the candidates is detected, or when the second extraction judging unit judges that all of the child instructions have been extracted; and
   an outputting unit for outputting the top instruction which has not been removed from the destructive-instruction candidate as the destructive-instruction to the extraction prohibiting means.

32. The optimization apparatus of claim 31, wherein the rearranging means further comprises:
   a first restoring means for restoring the DAGs before an extraction of a last instruction in the instruction storage means if the destructive instruction detecting means detects all the top instructions of DAGs of the program segment as destructive instructions; and
   a second restoring means for causing resource flags corresponding to resources whose values have been changed by the last instruction to return to a state before the extraction of the last instruction; and
   wherein after the last instruction is returned to a DAG, the instruction selecting means selects an instruction with a priority next to that of the returned instruction.

* * * * *